United States Patent
O'Neill et al.

(10) Patent No.: US 9,195,023 B2
(45) Date of Patent: Nov. 24, 2015

(54) REMOVABLE OPTICAL DEVICES FOR MOBILE ELECTRONIC DEVICES

(71) Applicant: olloclip, LLC, Huntington Beach, CA (US)

(72) Inventors: Patrick D. O'Neill, Huntington Beach, CA (US); Chong Pak, Lakewood, CA (US); Bobby Kong, Walnut Park, CA (US); Ryan Nguyen, Huntington Beach, CA (US)

(73) Assignee: olloclip, LLC, Huntington Beach, CA (US)

( * ) Notice: Subject to any disclaimer, the term of this patent is extended or adjusted under 35 U.S.C. 154(b) by 0 days.

(21) Appl. No.: 14/024,450

(22) Filed: Sep. 11, 2013

(65) Prior Publication Data

US 2014/0071547 A1 Mar. 13, 2014

Related U.S. Application Data

(60) Provisional application No. 61/780,642, filed on Mar. 13, 2013, provisional application No. 61/726,483, filed on Nov. 14, 2012, provisional application No. 61/701,570, filed on Sep. 14, 2012, provisional application No. 61/700,301, filed on Sep. 12, 2012.

(51) Int. Cl.
*G02B 15/14* (2006.01)
*G03B 11/00* (2006.01)
(Continued)

(52) U.S. Cl.
CPC .. *G02B 7/02* (2013.01); *G02B 7/14* (2013.01); *G02B 13/001* (2013.01); *G02B 15/10* (2013.01); *H04N 5/2254* (2013.01); *Y10T 29/49826* (2015.01)

(58) Field of Classification Search
CPC ............ G02F 1/29; G02B 7/10; G02B 7/102; G02B 25/002; G02B 7/021; G02B 23/125; G02B 7/02; G02B 7/028; G02B 7/14; G02B 7/023; G02B 7/04; G02B 7/08; G02B 7/32; G03B 17/14; G03B 17/12; H04N 5/23212

USPC ......... 359/827, 699, 819–824, 694, 319, 808, 359/811, 815; 396/71, 722, 544, 89, 106.6; D16/101, 134, 136, 200, 207, 219; 348/345
See application file for complete search history.

(56) References Cited

U.S. PATENT DOCUMENTS 971,798 A 10/1910 Somdal
D48,816 S 4/1916 De Ville
(Continued)

FOREIGN PATENT DOCUMENTS

CN 1797169 A 7/2006
CN 201173987 Y 12/2008
(Continued)

OTHER PUBLICATIONS

Focal, "Auxiliary Lens Set for Kodak Disc Camera", circa 1980s (photograph).
(Continued)

*Primary Examiner* — Dawayne A Pinkney
(74) *Attorney, Agent, or Firm* — Knobbe, Martens, Olson & Bear, LLP

(57) ABSTRACT

Some embodiments disclosed herein relate to an optical device with one or more optical components (e.g., lenses) attached to a retainer portion or clip. The optical device can be removably attached to mobile electronic devices, such as mobile phones, tablet computers, media players, and the like. The retainer portion may be configured so as not to interfere with a user's view of a display panel of the mobile device. The optical device may include one or more energy conveying paths to allow energy to be conveyed to and/or from various components of the mobile device, such as flashes or microphones. In some embodiments, additional features may be provided, such as optical components tilted to complement a tilt of an onboard camera of a mobile device, and structures or adapters to reduce friction or allow an optical device to be attached to mobile devices of varying thicknesses.

22 Claims, 28 Drawing Sheets

(51) Int. Cl.
*G02B 7/02* (2006.01)
*G02B 7/14* (2006.01)
*G02B 13/00* (2006.01)
*G02B 15/10* (2006.01)
*H04N 5/225* (2006.01)

(56) References Cited

U.S. PATENT DOCUMENTS

| | | |
|---|---|---|
| D138,816 S | 9/1944 | Glasser |
| D141,692 S | 6/1945 | Nemeth |
| 2,428,719 A | 10/1947 | Nemeth |
| D148,816 S | 2/1948 | Pemstein |
| D181,908 S | 1/1958 | Hertzler |
| D183,253 S | 7/1958 | Gebele |
| 3,090,282 A | 5/1963 | Angenieux |
| 3,133,140 A | 5/1964 | Winchell |
| 3,138,060 A | 6/1964 | Eggert et al. |
| 3,454,323 A | 7/1969 | Dierks et al. |
| 3,620,149 A | 11/1971 | Ogihara |
| 3,680,461 A | 8/1972 | Amesbury et al. |
| 3,796,489 A | 3/1974 | Sone et al. |
| 3,817,601 A | 6/1974 | Colaiace et al. |
| 3,828,991 A | 8/1974 | Moore |
| D234,007 S | 12/1974 | Ritter |
| D248,160 S | 6/1978 | Feinbloom et al. |
| 4,264,167 A | 4/1981 | Plummer |
| 4,305,386 A | 12/1981 | Tawara |
| D264,048 S | 4/1982 | Magner |
| D274,336 S | 6/1984 | Huckenbeck |
| D274,691 S | 7/1984 | Wallace |
| D275,766 S | 10/1984 | Suzuki |
| D295,871 S | 5/1988 | Charles |
| 4,760,510 A | 7/1988 | Lahti |
| 4,864,333 A | 9/1989 | Barber |
| 4,893,143 A | 1/1990 | Sheng-Huei |
| 5,050,963 A | 9/1991 | Murakami |
| 5,054,886 A | 10/1991 | Ozaki et al. |
| 5,311,358 A | 5/1994 | Pederson et al. |
| 5,416,544 A | 5/1995 | Stapleton |
| 5,455,711 A | 10/1995 | Palmer |
| 5,461,444 A | 10/1995 | Okura et al. |
| D374,878 S | 10/1996 | Palmer |
| D381,347 S | 7/1997 | Miyahara |
| D387,787 S | 12/1997 | Palmer |
| 5,781,351 A | 7/1998 | Murakami et al. |
| 5,831,778 A | 11/1998 | Chueh |
| 6,115,197 A | 9/2000 | Funahashi |
| 6,545,825 B2 | 4/2003 | Shoji et al. |
| 6,752,516 B1 | 6/2004 | Beadle |
| 6,889,006 B2 | 5/2005 | Kobayashi |
| 6,924,950 B2 | 8/2005 | Gventer et al. |
| 6,967,790 B2 * | 11/2005 | Wei ........................ 396/544 |
| D544,512 S | 6/2007 | Huang |
| D546,863 S | 7/2007 | Ito et al. |
| D560,702 S | 1/2008 | Tokiwa et al. |
| 7,600,932 B2 | 10/2009 | Senba et al. |
| 7,604,423 B2 | 10/2009 | Nagata et al. |
| 7,636,518 B2 | 12/2009 | Tanaka et al. |
| 7,639,353 B2 | 12/2009 | Rooke |
| D617,360 S | 6/2010 | Endo et al. |
| 7,782,375 B2 | 8/2010 | Chambers et al. |
| 7,967,513 B2 | 6/2011 | Zhang |
| 8,000,589 B2 | 8/2011 | Chan |
| 8,040,621 B2 | 10/2011 | Chang et al. |
| D649,970 S | 12/2011 | Lyford et al. |
| D650,821 S | 12/2011 | Verhey |
| 8,073,324 B2 * | 12/2011 | Tsai ........................ 396/544 |
| 8,208,210 B2 | 6/2012 | An et al. |
| 8,279,544 B1 | 10/2012 | O'Neill |
| D678,379 S | 3/2013 | O'Neill et al. |
| D686,265 S | 7/2013 | O'Neill et al. |
| 8,508,868 B2 | 8/2013 | Weber et al. |
| 8,573,810 B2 | 11/2013 | Mahaffey et al. |
| 8,593,745 B2 | 11/2013 | O'Neill |
| D700,228 S | 2/2014 | O'Neill et al. |
| 8,687,299 B1 | 4/2014 | Sandford et al. |
| 8,891,187 B2 | 11/2014 | O'Neill |
| 2004/0218081 A1 | 11/2004 | Lohr et al. |
| 2005/0088612 A1 | 4/2005 | Smith et al. |
| 2005/0099526 A1 | 5/2005 | Wu et al. |
| 2007/0049340 A1 | 3/2007 | Wang et al. |
| 2007/0053682 A1 | 3/2007 | Chang |
| 2007/0196090 A1 | 8/2007 | Kubo |
| 2007/0275763 A1 | 11/2007 | Sawadski et al. |
| 2007/0280677 A1 | 12/2007 | Drake et al. |
| 2008/0174891 A1 | 7/2008 | Kudoh |
| 2009/0109558 A1 | 4/2009 | Schaefer |
| 2009/0169198 A1 | 7/2009 | Chang |
| 2009/0181729 A1 | 7/2009 | Griffin, Jr. et al. |
| 2010/0048243 A1 | 2/2010 | Fourquin et al. |
| 2010/0328420 A1 | 12/2010 | Roman |
| 2011/0043683 A1 | 2/2011 | Beach et al. |
| 2011/0110654 A1 | 5/2011 | Maki |
| 2012/0157160 A1 * | 6/2012 | Ozcan et al. ............. 455/556.1 |
| 2013/0028591 A1 | 1/2013 | Hicks |
| 2013/0094846 A1 | 4/2013 | Apter |
| 2013/0107109 A1 | 5/2013 | Yang |
| 2013/0148954 A1 | 6/2013 | Uehara et al. |
| 2014/0078594 A1 * | 3/2014 | Springer ........................ 359/672 |
| 2014/0253789 A1 | 9/2014 | O'Neill |
| 2014/0320987 A1 | 10/2014 | O'Neill |

FOREIGN PATENT DOCUMENTS

| | | |
|---|---|---|
| JP | 10-115858 | 5/1998 |
| JP | 2000-311427 | 11/2000 |
| JP | 2003-295307 | 10/2003 |
| JP | 2004-191897 | 7/2004 |
| JP | 2006-251150 | 9/2006 |
| JP | 2007-079362 | 3/2007 |
| JP | 2007-206137 | 8/2007 |
| JP | 2007-219433 | 8/2007 |
| KR | 10-0842373 | 7/2008 |
| WO | WO 2006/002674 | 1/2006 |
| WO | WO 2012/082738 A1 | 6/2012 |
| WO | WO 2012/128936 | 9/2012 |

OTHER PUBLICATIONS

Kickstarter.Com, "Glif—iPhone 4 Tripod Mount & Stand", http://www.kickstarter.com/projects/danprovost/glif-iphone-4-tripod-mount-and-stand, Oct. 3, 2013 (selected screenshots from video).

Amazon.Com, "Fish Eye lens + Wide Angle Lens + Macro Lens 3-in-1 Kit for iPod iPhone 4g," [Customer Reviews included] printed Feb. 3, 2012 in 10 pages.

International Preliminary Report on Patentability in PCT Application No. PCT/US2013/059304 dated Mar. 26, 2015.

* cited by examiner

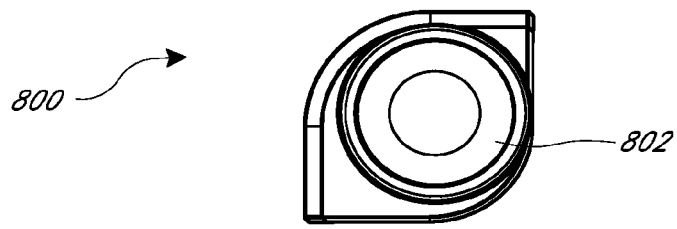
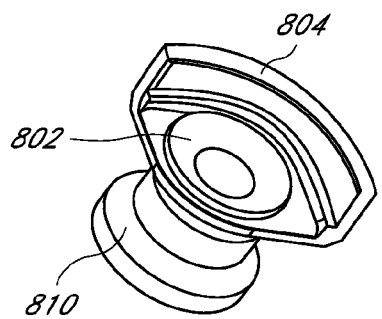
FIG. 8A
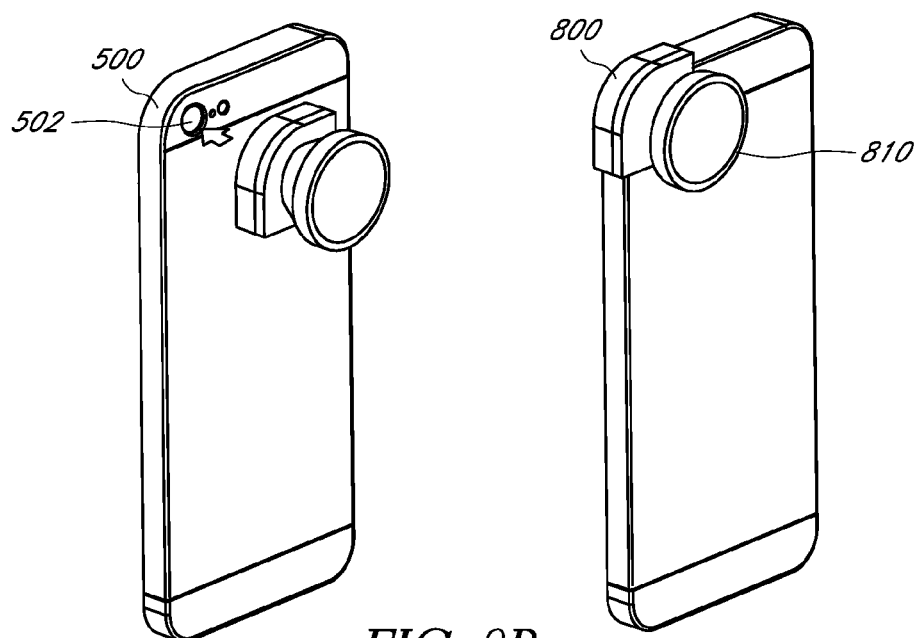
FIG. 8B

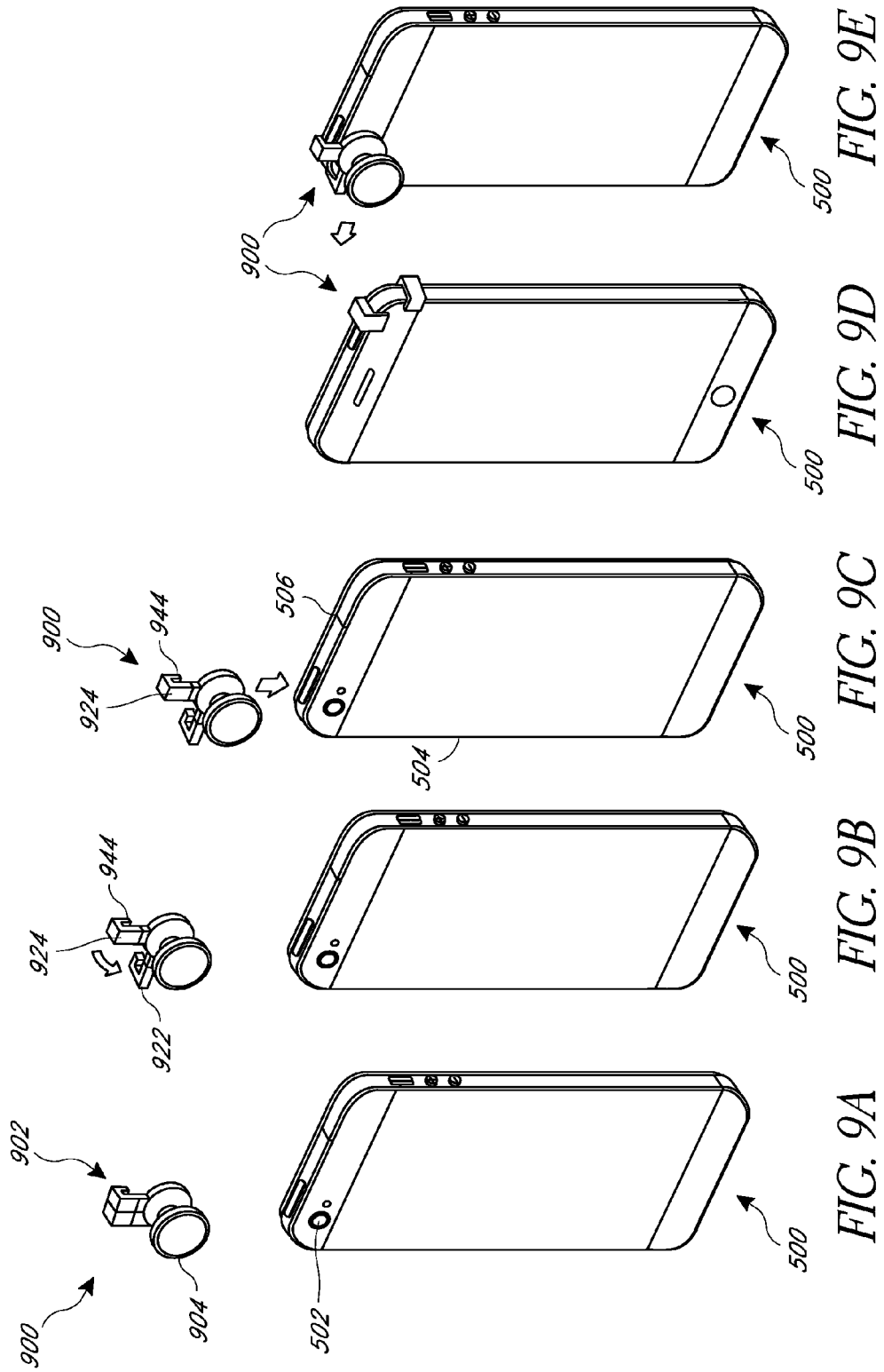

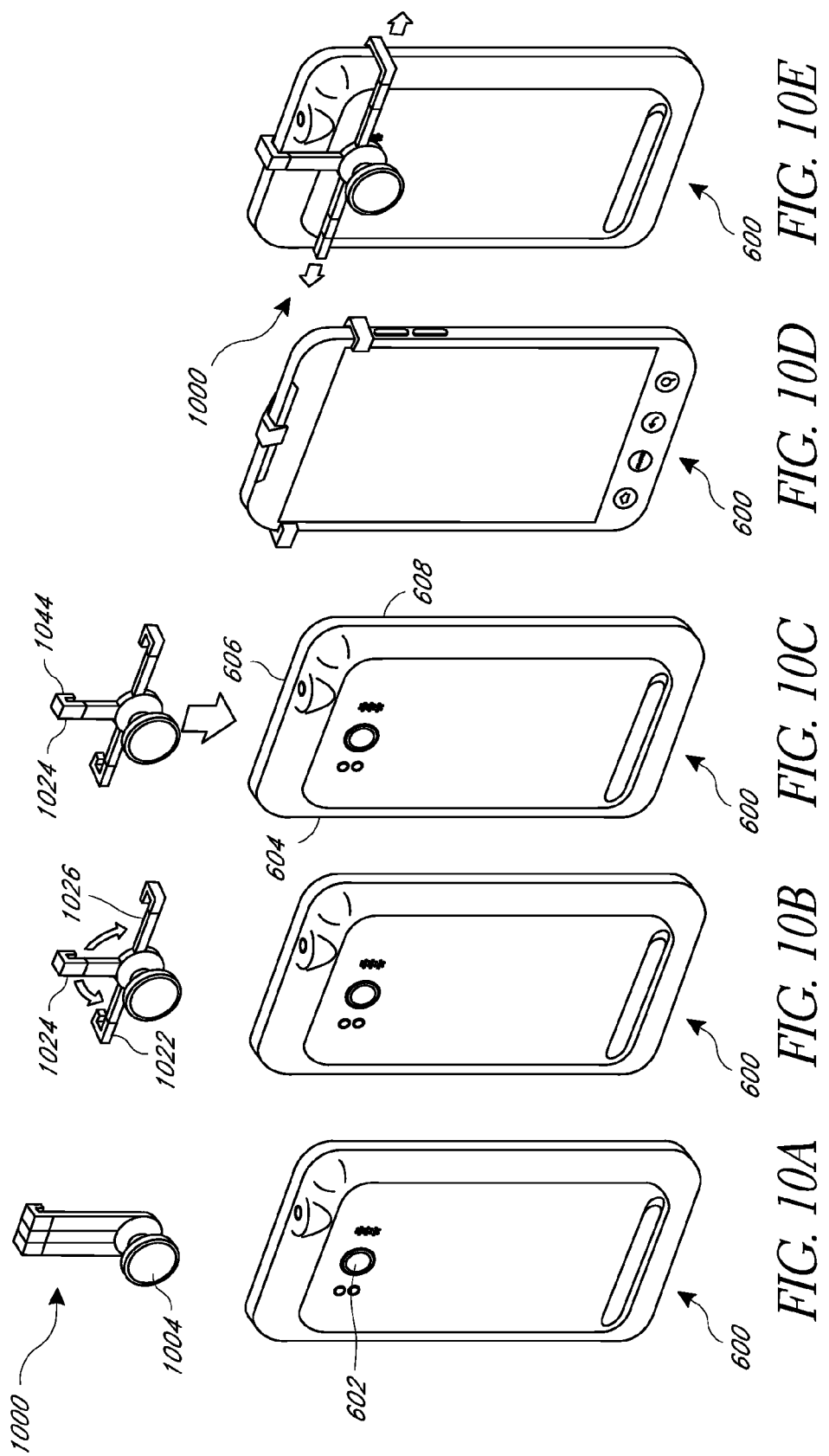

REMOVABLE OPTICAL DEVICES FOR MOBILE ELECTRONIC DEVICES

RELATED APPLICATIONS

This application claims the benefit of U.S. Provisional Patent Application No. 61/700,301, filed on Sep. 12, 2012 and entitled "Removable Lenses for Mobile Electronic Devices," U.S. Provisional Patent Application No. 61/701,570, filed on Sep. 14, 2012 and entitled "Removable Lenses for Mobile Electronic Devices," U.S. Provisional Patent Application No. 61/726,483, filed on Nov. 14, 2012 and entitled "Removable Lenses for Mobile Electronic Devices," and U.S. Provisional Patent Application No. 61/780,642, filed on Mar. 13, 2013 and entitled "Removable Lenses for Mobile Electronic Devices," the entire contents of all of which are hereby incorporated by reference herein and made part of this specification for all that they disclose.

BACKGROUND OF THE INVENTIONS

1. Field of the Invention

This invention relates generally to accessories for mobile electronic devices (e.g., mobile telephones, mobile content players, mobile information storage and display devices, electronic pad devices, laptop computers, desktop computers, etc.), and specifically to removable functional components for mobile electronic devices.

2. Description of the Related Art

In recent years, many advances in computer networking and processing technology have made it possible for mobile electronic devices to include cameras that permit users to capture images. In many cases, these images can be stored, processed, and transmitted. However, there are many design constraints on onboard cameras in mobile electronic devices that can limit the weight, size, expense, shape, adjustability, and overall quality of the lensing systems of such cameras. Consequently, many cameras in mobile electronic devices are inadequate for a wide variety of photographic needs and may produce lower quality photographic images. These deficiencies cannot be addressed by existing modular or detachable lensing systems for use with conventional film or digital cameras due to significant differences between such lensing systems and mobile electronic devices, including incompatibilities in attachment structures, weight, optics, size, transportation, storage, ergonomics, and/or portability.

BRIEF DESCRIPTION OF THE DRAWINGS

Certain embodiments of the inventions will now be discussed in detail with reference to the following figures. These figures are provided for illustrative purposes only, and the inventions are not limited to the subject matter illustrated in the figures.

FIG. 8A illustrates several different views of another example removable optical device.

FIG. 8B illustrates the optical device of FIG. 8A being attached to a mobile electronic device.

FIGS. 9A-9E illustrate several different views of attaching a removable optical device with multiple moveable securement members to a mobile device.

FIGS. 10A-10E illustrate several different views of attaching another example of a removable optical device with multiple moveable securement members to a mobile device.

DETAILED DESCRIPTION OF EMBODIMENTS

Figure 1A:
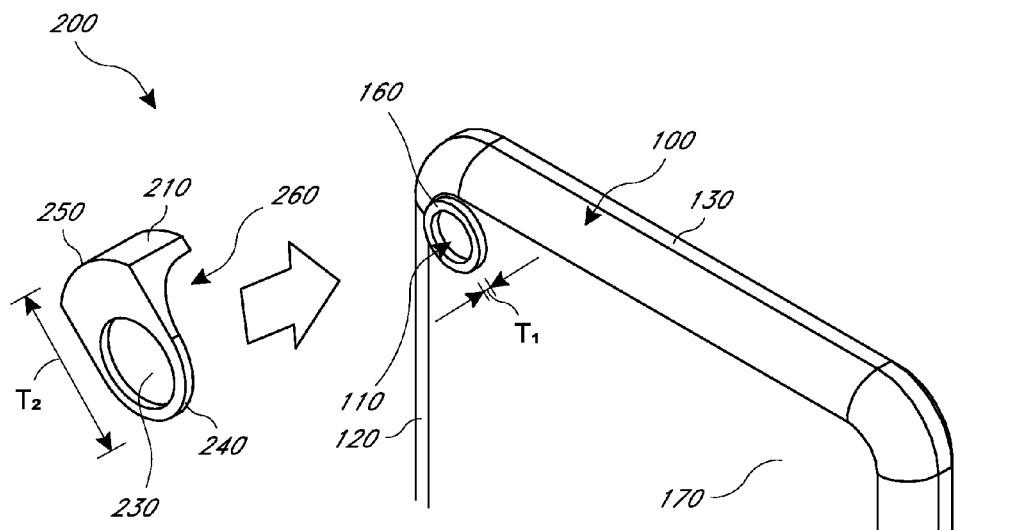
FIGS. 1A and 1B illustrate an example of a mobile device and a removable optical device.

The following detailed description is directed to certain specific examples of embodiments of the disclosure. In this description, reference is made to the drawings wherein like parts are designated with like numerals throughout the description and the drawings. The inventions are not limited to the examples expressly illustrated or described in this specification. Any step, feature, and/or structure illustrated or described in any embodiment of this specification can be used with or used in place of any other step, function, and/or structure illustrated or described in this specification.

Many mobile electronic devices include onboard cameras. Users of the mobile devices can therefore capture images and/or video using the onboard cameras. However, there are many design constraints on such onboard cameras that can limit the weight, size, expense, shape, adjustability, and overall quality of the lensing systems of such cameras. Existing auxiliary lensing systems for mobile devices may not be compatible with certain mobile devices or certain features of some mobile devices. For example, some mobile devices have protruding protective structures which surround the onboard camera lenses. Such structures can inhibit or prevent existing auxiliary systems from attaching to the mobile device. As another example, some mobile devices have displays which may cover substantially all of a front face of the mobile device. Existing auxiliary lensing systems configured to clip on or over a corner or edge of the mobile device may obstruct a portion of such displays. As yet another example, some mobile devices include input and/or output components (e.g., flashes, microphones) in close proximity to the camera lens. Existing auxiliary lensing systems may obstruct such components. As a further example, users may attach screen protectors to mobile devices, or mobile devices may otherwise vary in thickness. Existing auxiliary lensing systems that clip on or over a corner or edge of a mobile device may not be able to clip onto devices of varying thickness.

Some aspects of the present disclosure relate to optical devices configured to attach to mobile devices and to provide enhanced photographic functionality when using onboard cameras of mobile devices. Such optical devices can include one or more optical components, such as macro lenses, wide angle lenses, telephoto lenses, fisheye lenses, lens filters (e.g., polarizers, coloring or darkening filters, etc.), and the like. Such optical components can be used to alter or enhance light that is conveyed to an onboard camera of the mobile device. In addition, some optical devices may be configured to be used with mobile devices that have protruding protective or mounting structures. In some embodiments, an optical device may be configured to attach to a mobile device by contacting only non-parallel sides of the mobile device. This can prevent obstruction of a display on a front face of a mobile device when the optical device attaches, contacts, or obstructs only a portion of the rear face and/or first and second edges (e.g., a top and a side edge). In some embodiments, an optical device may be configured to convey or permit passage of energy (e.g., sound or light) to or from a component in close proximity to an onboard camera lens of a mobile device, such as a flash or a microphone. In some embodiments, an optical device may be configured to attach to mobile devices which have protective covers, or to multiple different mobile devices which may have different thicknesses.

Figure 1B:
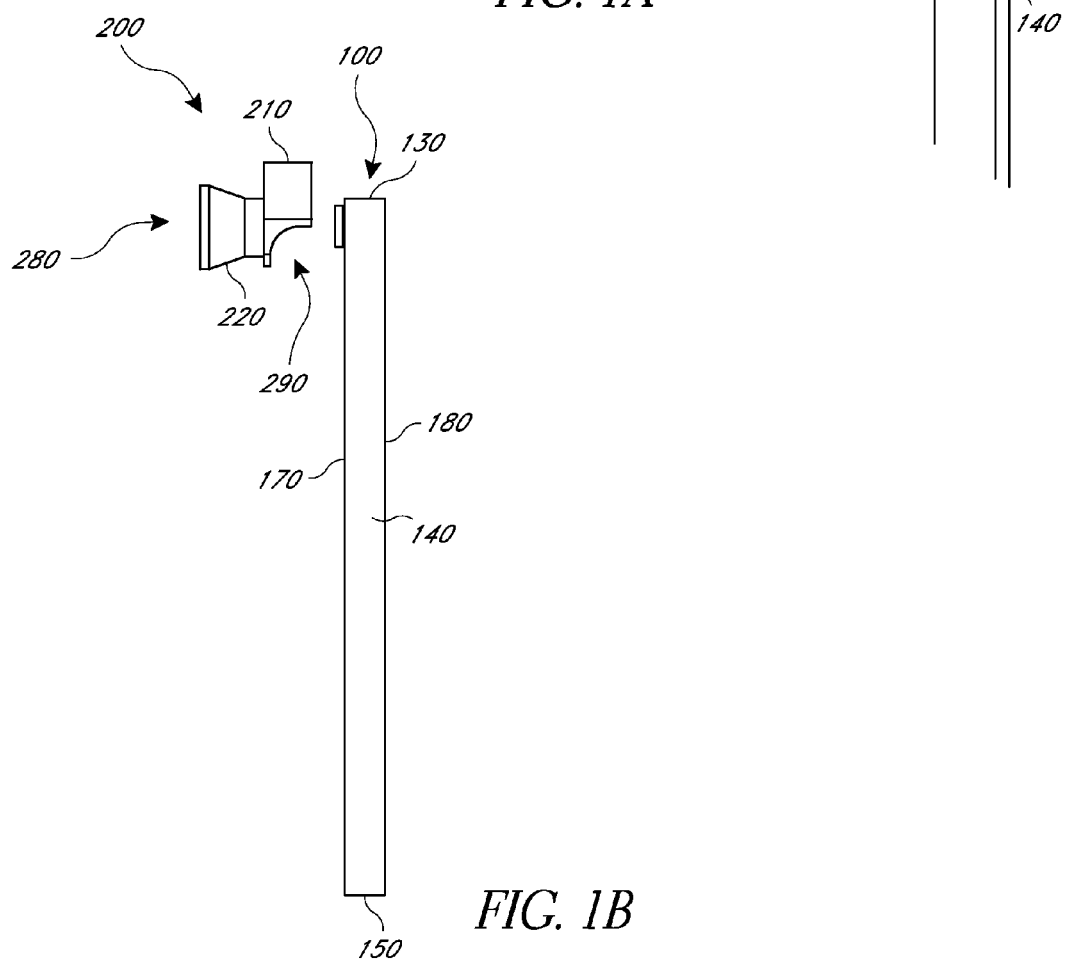

FIGS. 1A and 1B illustrate a mobile electronic device 100, such as a mobile phone, personal media player, or tablet computer. For example, the mobile electronic device 100 may be an iPod Touch electronic device sold by Apple, Inc., of Cupertino, Calif. This mobile device 100 can include an onboard camera 110 on a first generally planar surface, such as a rear face 170. The rear face 170 may be generally parallel to a second generally planar surface, such as a front face 180. The onboard camera 110 may be located on the rear face 170 near a corner of the mobile device 100 where first and second generally orthogonal sides 120, 130 generally converge. The onboard camera 110 can also be positioned generally opposite a corner where third and fourth generally orthogonal sides 140, 150 generally converge. The first side 120 and the third side 140 can be generally parallel to each other, and the second side 130 and the fourth side 150 can be generally parallel to each other.

The mobile device 100 can comprise an integral, non-removable, firmly attached protective structure or mounting structure 160 that is permanently affixed to or formed as part of the mobile device 100 as sold. In some embodiments, as illustrated, the protective structure 160 can comprise a continuous or substantially continuous ring that surrounds or substantially surrounds an outer periphery of the onboard lens of the onboard camera 110 of the mobile device 100. In some embodiments, the ring is made of a non-magnetic metal such as aluminum. In the illustrated example, the protective structure 160 extends in a rearward direction above or beyond the rear face 170 by an amount $T_1$. In some embodiments, as shown, the amount $T_1$ of rearward extension of the protective structure 160 beyond or above the rear face 170 is small, such as less than or equal to about 3 millimeters, less than or equal to about 2 millimeters, or less than or equal to about 1 millimeter. In some embodiments, the amount of rearward extension of the protective structure 160 beyond or above the rear face 170 is less than or equal to the thickness of a side region on the mobile device 100 along one of its sides that is substantially non-curved or flat. Users are typically not required to attach the protective structure 160 to the mobile device 100 because the protective structure 160 is typically already attached to the mobile device 100 when acquired by the user.

An optical device 200 configured to attach to a mobile device with a protective structure 160 can comprise a mounting portion 210 and an optical component 220. The mounting portion 210 can comprise an inner side 240, an outer side 250, and an aperture 230. In some embodiments, the optical device 200 may be removably attached to a mobile electronic device 100 that includes an onboard camera 110 on a generally planar rear face 170 without requiring the use of a clip or other structure that grips, contacts, or obstructs a face of the mobile electronic device generally opposite of, and generally parallel to, the rear face 170. For example, a first sidewall 260 of the optical device 200 may contact first and second generally converging, generally orthogonal edges 120, 130 of a mobile electronic device 100, thereby providing accurate alignment of an optical component 220 with an onboard camera 110 of the mobile electronic device 100. However, in some embodiments, the optical device 200 does not need to clip over one or both of the generally orthogonal edges 120, 130 and contact the face 180 of the mobile electronic device 100 opposite the face 170 with which the onboard camera 110 is generally aligned.

In some embodiments, as illustrated, the distance $T_2$ from the inner side 240 to the outer side 250 generally corresponds to the distance between the region immediately below the lower edge of the protective structure 160 and the top or first side 120 of the mobile device 100 (or the distance between the convergence of first and second sides 120, 130 and a region past the protective structure 160 in a direction generally away from the convergence or corner). The aperture 230 of the mounting portion 210 can be generally circular and can be configured to receive the optical component 220. In some embodiments, the cross sectional width or diameter of the aperture 230 can also generally correspond to an outer cross sectional width of diameter of the protective structure 160, such that the protective structure 160 can fit closely or tightly in a contacting relationship within the aperture 230. The optical component 220 can be configured to receive light on a first side 280 and to transmit light through to a second side 290. The light can be changed by the optical component 220 to modify an image produced by the onboard camera 110 of the mobile device 100. For example, in some embodiments, the optical component 220 can change the size of an image (e.g., enlarge or diminish the image), change the color of an image, produce a wider angle of vision, attenuate light (e.g., darken an image), filter light, etc. The optical component 220 can be removable from the mounting portion 210. A plurality of different optical components 220 can be provided for interchangeable attachment to the mounting portion 210, depending on the particular needs of a user.

In some embodiments, the mounting portion 210 can be shaped and sized to attach to the mobile device 100 near a corner of the mobile device 100 where first and second generally orthogonal sides 120, 130 generally converge. The mounting portion 210 can also be positioned generally opposite from third and fourth generally orthogonal sides 140, 150. In some embodiments, as the mounting portion 210 is moved close to, and into contact with, the protective structure 160 (if present) of the mobile device 100, the protective structure 160 fits within or otherwise connects with the aperture 230 of the protective structure 160. In some embodiments, the outer side 250 of the mounting portion 210 can be moved into position along an outer edge of the mobile device 100, such as first side 120 and/or second side 130. In some embodiments, as illustrated, when the mounting portion 210 is attached to the mobile device 100, the optical component 220 is positioned generally co-axially with, and in a generally overlapping relationship with, the lens of the onboard camera 110.

Figure 2:
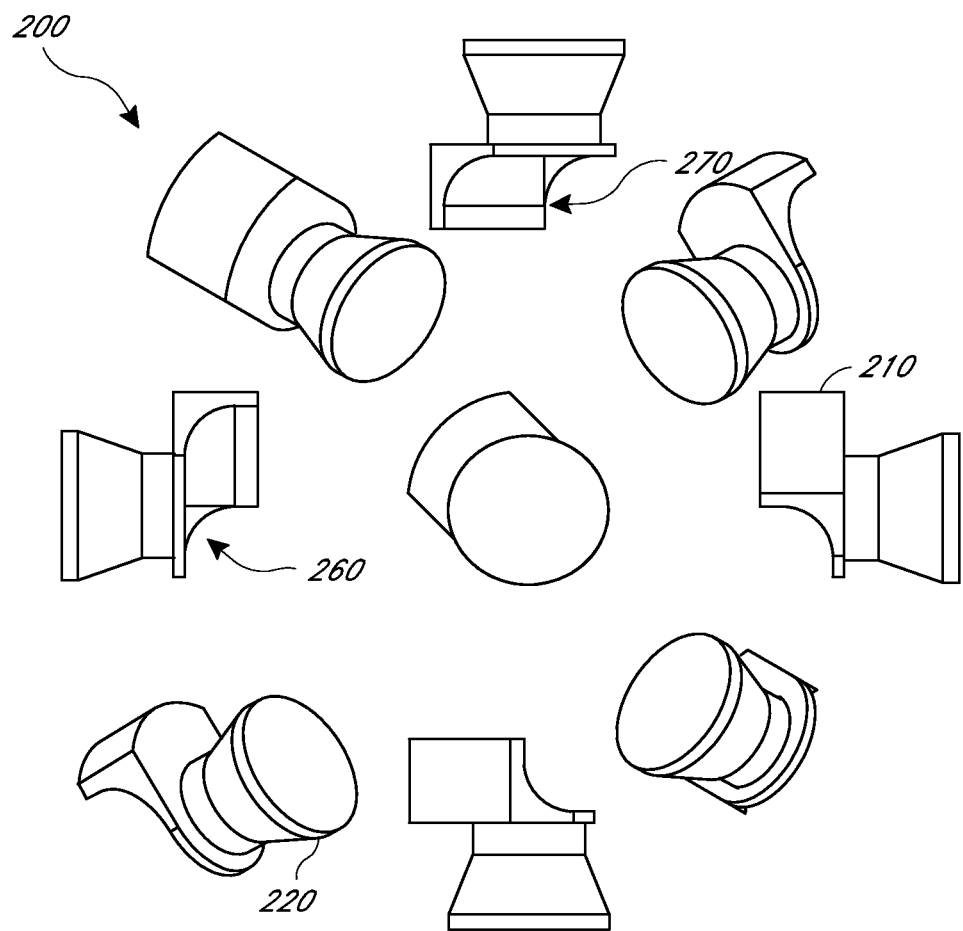
FIG. 2 illustrates several different views of the optical device of FIGS. 1A and 1B in nine different views.

FIG. 2 provides many different views of the optical device 200, illustrating many curvatures that are configured to generally correspond to the edges and faces of a mobile device to which the optical device 200 is configured to attach. In some embodiments, as illustrated, an alternative or additional connection structure 270, such as a generally arcuate protrusion or recess, can be provided. The connection structure 270 may be positioned on a first sidewall 260 of the mounting portion 210 that is configured to face and contact the rear face 170 of the mobile device 100. In some embodiments, the connection structure 270 can have a different diameter than the diameter of the aperture 230. For example, the diameter of the connection structure 270 may be substantially the same as the outer diameter of the protective structure 160. In such cases, the size of the aperture 230 may be selected based on the optical component 220.

In some embodiments, as illustrated in FIGS. 1A, 1B, and 2, the mounting portion 210 is configured to contact no more than two or no more than three different sides of a mobile electronic device, such as the rear face of the mobile electronic device in which the onboard camera is mounted, and a top edge and/or a side edge of the mobile device, without requiring contact between the mounting portion 210 and the front face of the mobile electronic device generally opposite from the rear face.

Figure 3A:
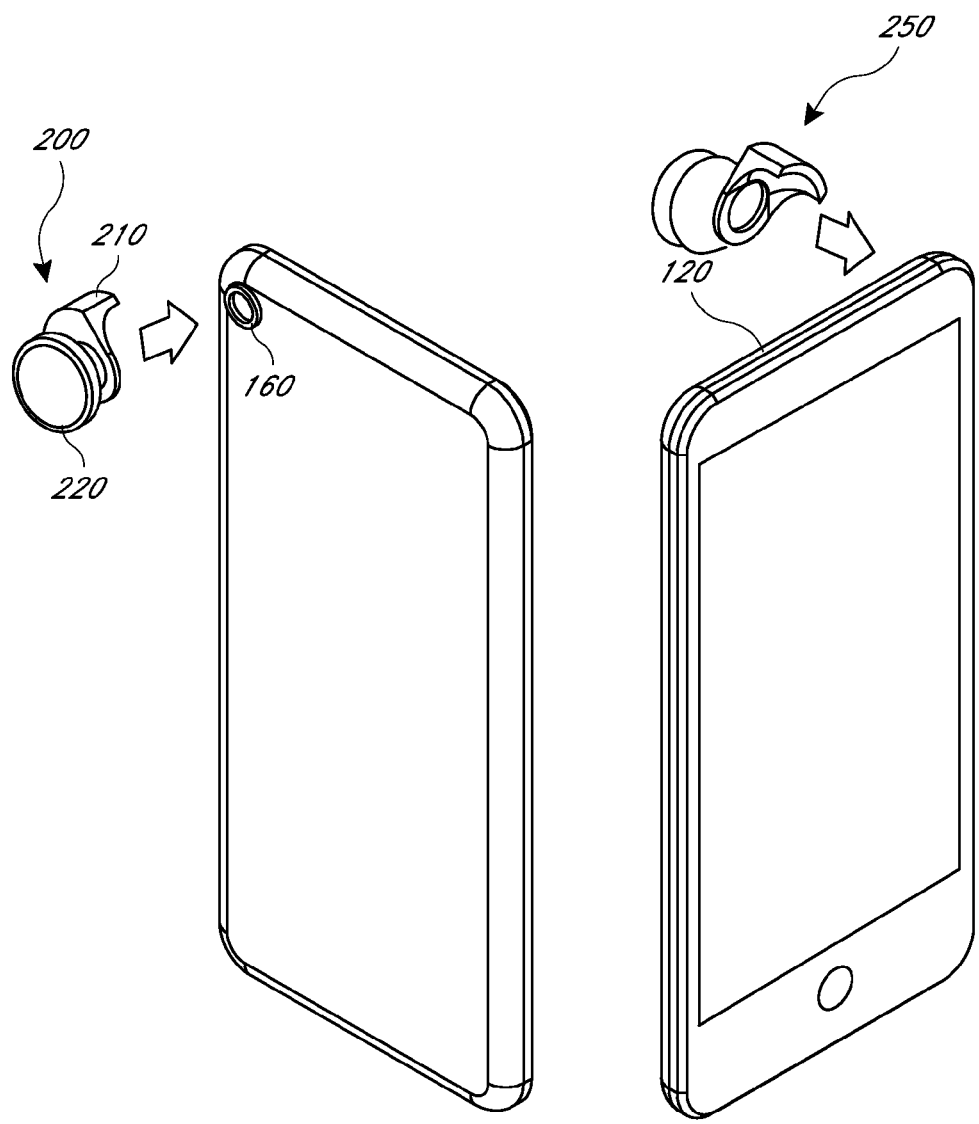
FIGS. 3A and 3B illustrate the optical device of FIGS. 1A and 1B being attached to a mobile device.

FIG. 3A illustrates a rear perspective view and a front perspective view of the optical device 200 approaching the mobile device 100. A user may advance the optical device 200 towards the protective structure 160 on the rear face of the mobile device 100. The mounting portion 210 of the optical device 200 may be oriented with respect to the mobile device 100 such that at least a portion the outer side 250 may overlap at least a portion of the first side 120 of the mobile device (or a portion of the second side 130, or a portion of both the first side and the second side 120, 130, or a portion of rounded corner where the first side 120 and second side 130 generally converge) when the optical device 200 is attached to the mobile device 100.

Figure 3B:
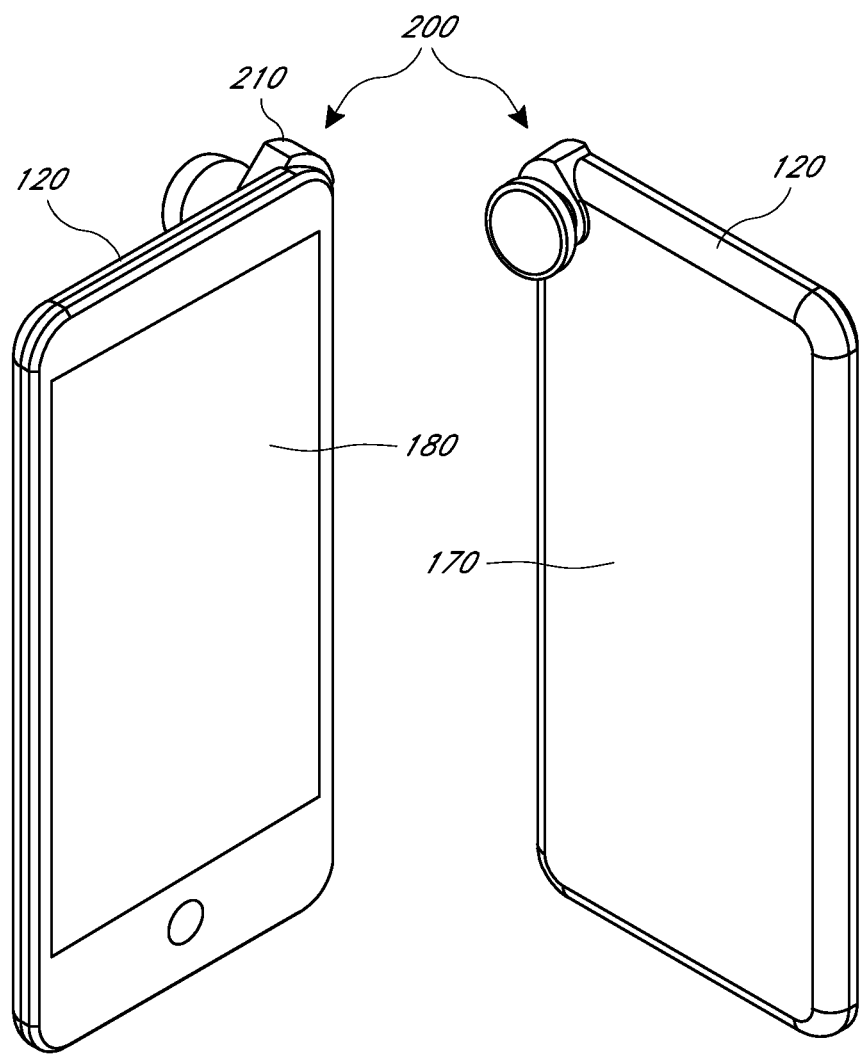

FIG. 3B illustrates a rear perspective view and a front perspective view of the optical device 200 removably attached to the mobile device 100. When attached, the optical device 200 may only contact the mobile device 100 on three sides. As shown in FIG. 3B, the mounting portion 210 of the optical device 200 may only contact the mobile device 100 on first and second sides 120, 130 and rear face 170. The optical device 200 may not contact, overlap, or obstruct the front face 180 of the mobile device 100 when the optical device 200 is attached in this manner. As a result, a video display or some other component of the mobile device 100 that extends to or generally toward a side of the mobile device with which the optical device 200 is in contact, such as the first side 120 or the second side 130, may remain unobstructed even when the optical device 200 is attached to the mobile device 100.

In some embodiments the optical device 200 may not contact the mobile device 100 on the rear face 170, but rather only on the protective structure 160 (if present) of the rear face 170 and the first and/or second sides 120, 130. In some embodiments, tension between the point of contact between the protective structure 160 and the mounting portion 210 and the point of contact between the outer edge of the mounting portion 210 and first edge 120 of the mobile device 100 (or the second edge 130 of the mobile device, or a combination of the first and second edges 120, 130) is sufficient to removably retain the mounting portion 210 on the mobile device 100 during use.

Figure 4A:
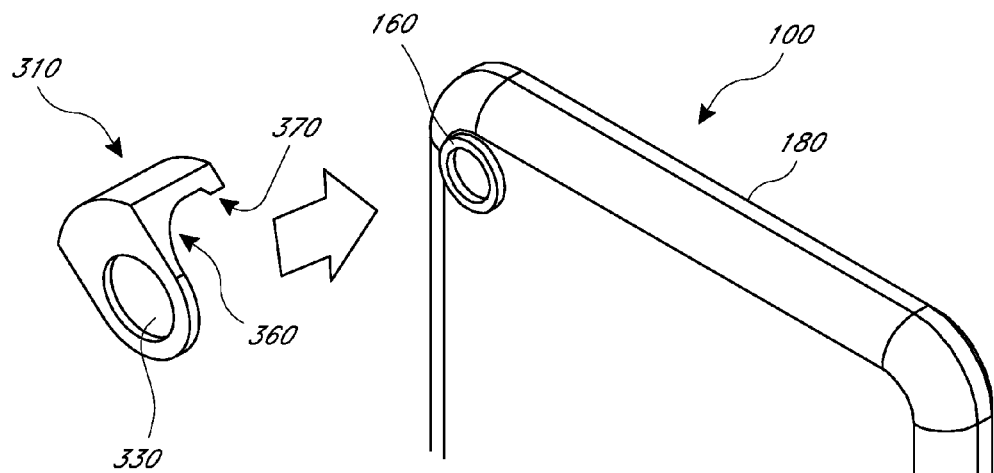
FIGS. 4A and 4B illustrate an example of a mobile device and a removable optical device.
Figure 4B:
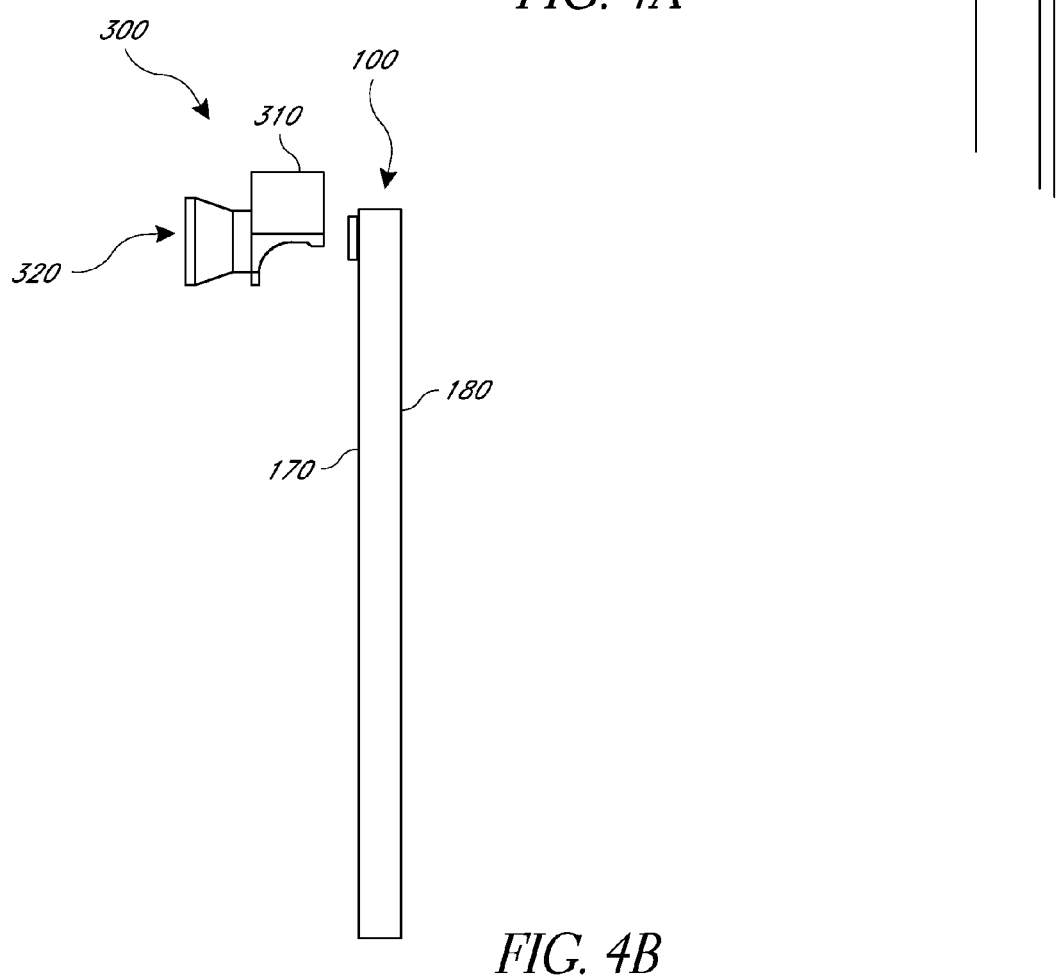

FIGS. 4A and 4B illustrate an embodiment of an optical device 300 that may include a mounting portion 310 and an optical component 320 that are similar or identical in many respects to the optical device 200 of FIG. 1. A first sidewall 360 of the mounting portion 310 may face or contact the rear face 170 and/or one or more sides of the mobile device 100, such as first and/or second sides 120, 130, when the optical device 300 is attached. The mounting portion 310 of the optical device 300 can also include a securing portion 370 (e.g., a generally downwardly extending, overhanging structure extending away from a top surface of the mounting portion 310) that is configured to contact an opposing front face 180 of a mobile device 100 when the optical device 300 is attached to the mobile device 100. The mounting portion 310 can be removably secured to the mobile device 100 such that the optical component 320 is positioned generally coaxial with an onboard camera lens of the mobile device 100.

Figure 5:
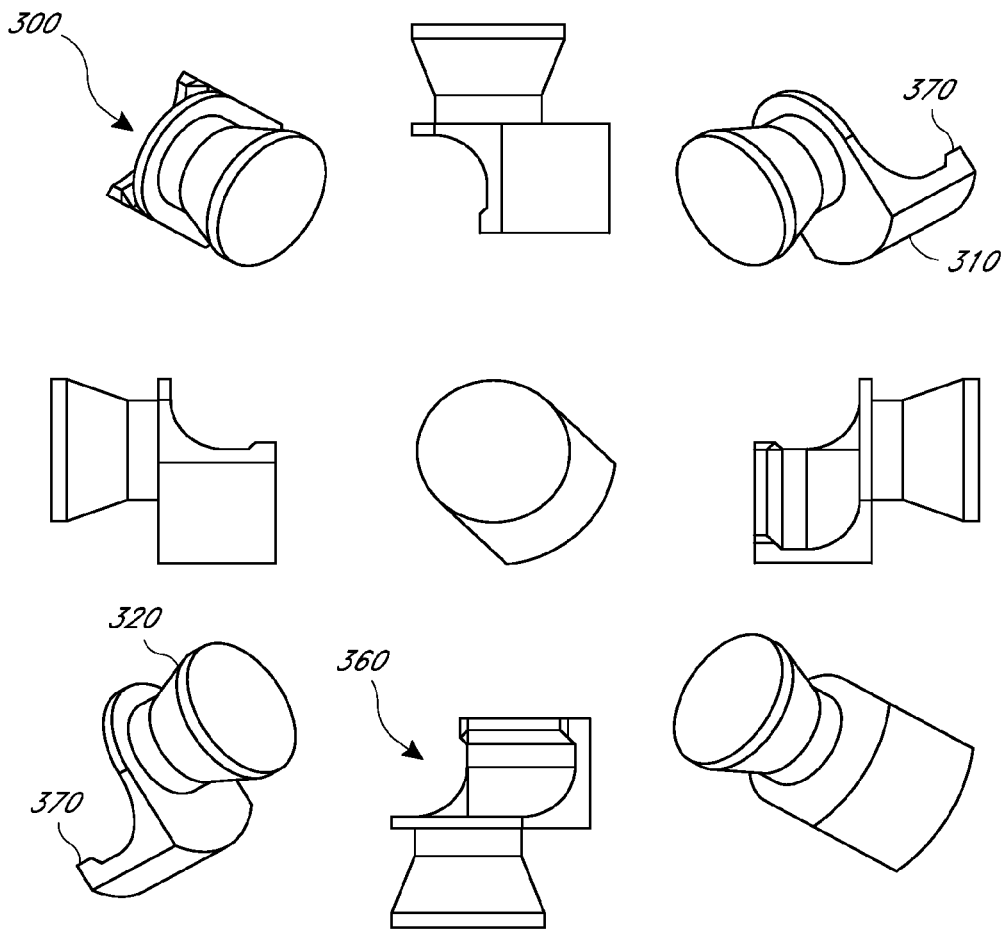
FIG. 5 illustrates several different views of the optical device of FIGS. 4A and 4B in nine different views.

FIG. 5 includes several different views of the optical device 300, illustrating many curvatures that are configured to generally correspond to the edges and faces of a mobile device to which the optical device 300 is configured to attach.

Figure 6A:
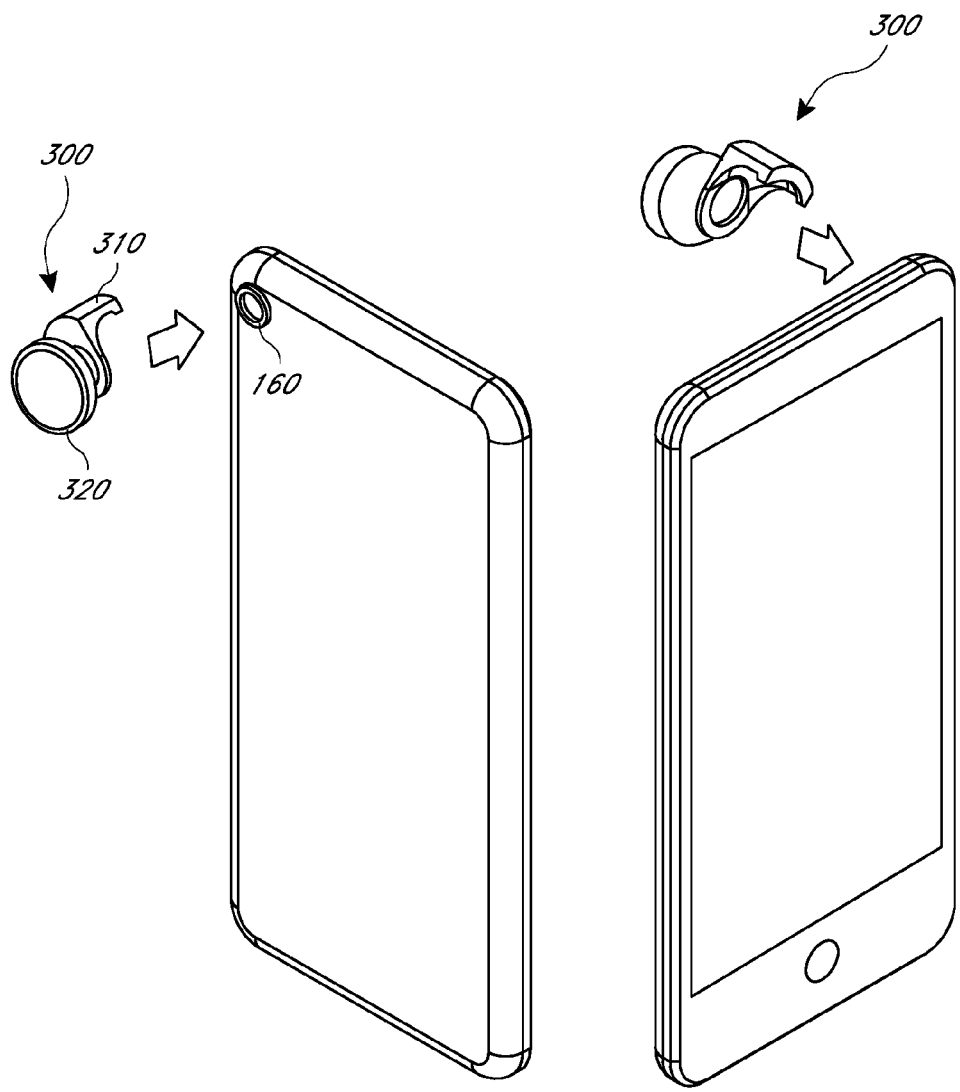
FIGS. 6A and 6B illustrate the optical device of FIGS. 4A and 4B being attached to a mobile device.
Figure 6B:
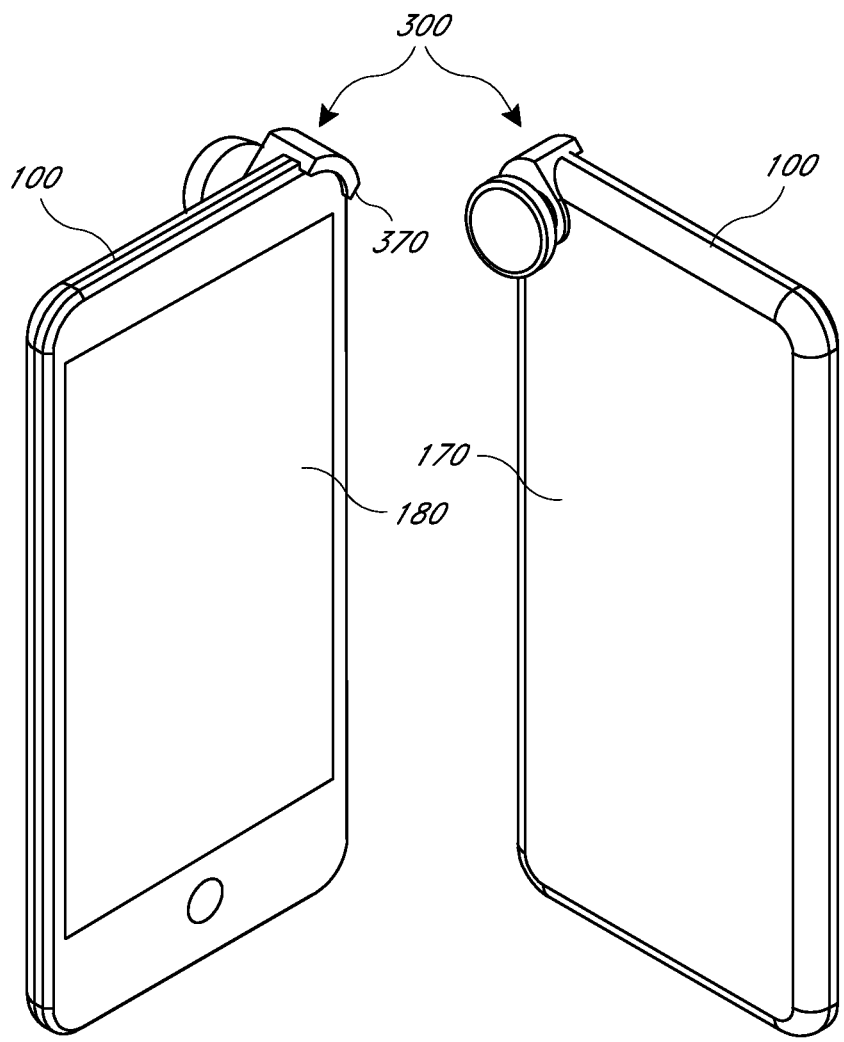

As illustrated in FIGS. 6A and 6B, the optical device 300 may be removably attached to the mobile device 100. In some embodiments, the optical device 300 may be removably attached to the mobile device by the tension created by: (1) a region of contact between a protective structure 160 (if present) of the mobile device 100 and an aperture 330 (or some other connection structure) of the mounting portion 310; (2) the region of contact between the first sidewall 360 of the mounting portion 310 and the rear face of the mobile device 100; (3) a region of contact between the securing portion 370 and the front face 340 of the mobile device 100; (4) a point of contact between the outer edge of the mounting portion 310 and first edge 120 (or the second edge 130, or both the first edge and the second edge) of the mobile device 100;

and/or (5) the front and rear points of contact between the mounting portion 310 and the mobile device 100 along a portion of the first edge 120 (or the second edge 130, or a combination of the first edge and the second edge) of the mobile device 100.

In some embodiments, as illustrated in FIGS. 4A, 4B, 5, 6A, and 6B, the surface area of contact or overlap between the portion of the mounting portion 310 configured to be positioned on or near the rear face of the mobile electronic device is substantially larger (e.g., at least about 2 or 3 times larger) than the surface area of contact or overlap between the portion of the mounting portion 310 configured to be positioned on or near the front face of the mobile electronic device.

Figure 7A:
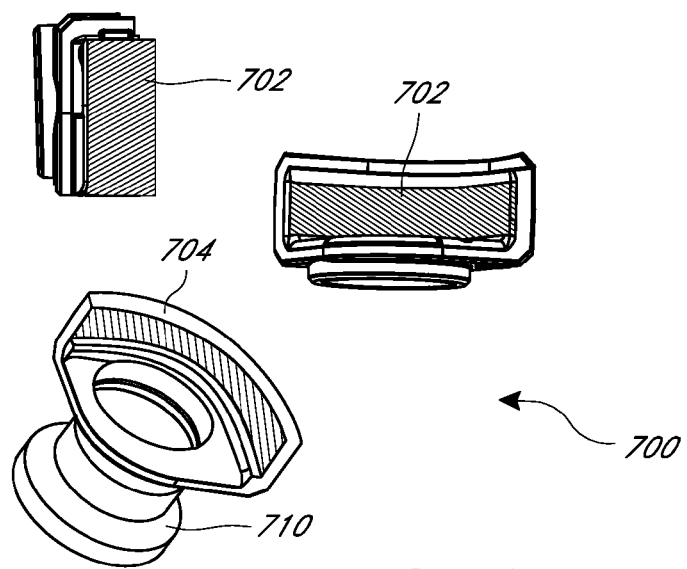
FIG. 7A illustrates several different views of a removable optical device.
Figure 7B:
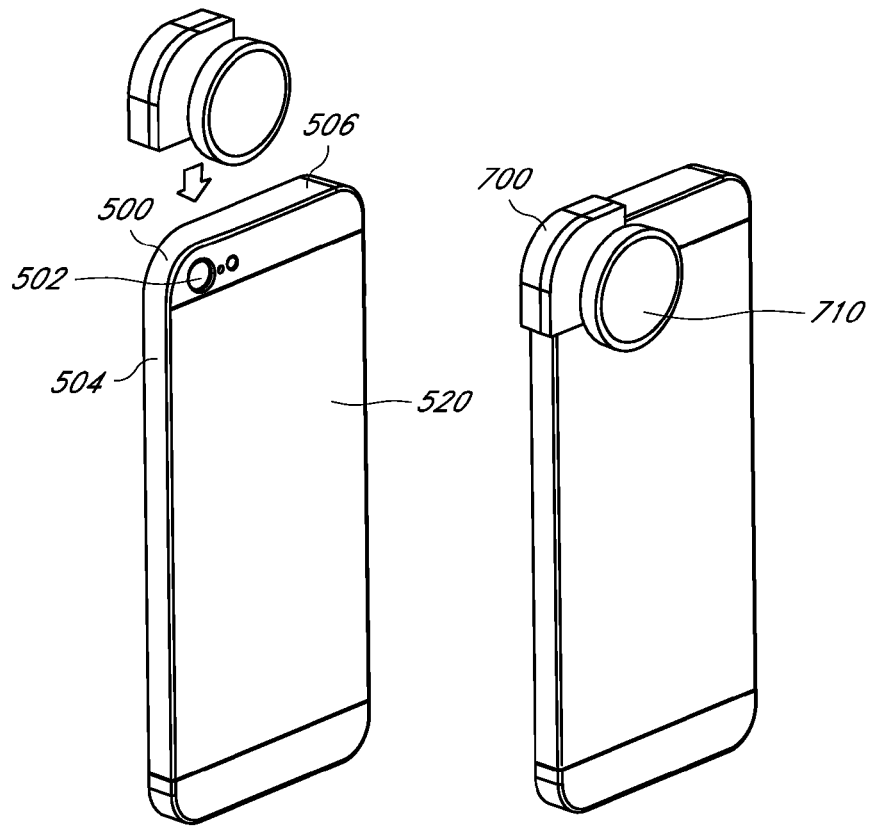
FIG. 7B illustrates the optical device of FIG. 7A being attached to a mobile electronic device.

FIGS. 7A and 7B show an optical device 700 that may be removably attached to a mobile device 500. The mobile device 500 may be similar or identical in many respects to the mobile device 100 described above. In some embodiments, the mobile device 500 may not have a protruding protective structure that generally surrounds an onboard camera 502. For example, the mobile device 500 may be an iPhone 5 mobile phone sold by Apple, Inc., of Cupertino, Calif.

The optical device 700 may be similar or identical in many respects to the optical devices 200, 300 described above. For example, the optical device 700 may include an alignment or attachment structure, such as an upper wall 704, and an optical component 710 that extends from a sidewall 706. The optical device 700 may be configured to be removably attached to a mobile device 500 that includes an onboard camera 502 on a generally planar rear face 520 in such a manner that the optical component 710 is positioned generally co-axial or generally aligned with the onboard camera 502. The optical device 700 may attach to the mobile device 500 such that the optical device 700 does not overlap, contact, or obstruct a generally planar front face that is generally parallel to the rear face 520.

The upper wall 704 may be contoured to conform to an area of the mobile device 500 where first and second generally orthogonal, generally converging sides 504, 506 generally converge. For example, the upper wall 704 may be generally curvilinear in shape to conform to a corner of the mobile device 500. The upper wall 704 may contact the first and second generally converging sides or edges 504, 506, thereby providing accurate alignment of the optical component 710 with the onboard camera 502 in a predictable, repeatable fashion without requiring manual alignment or adjustment of the position of the optical component 710. The rear face 520 (and the generally parallel front face) of the mobile device 500 may be generally orthogonal to each of the sides or edges 504, 506. The sidewall 704 way be contact or be in close proximity with the rear face 520 when the optical device 700 is attached to the mobile device 500.

In some embodiments, the optical device 700 does not need to clip over one or both of the generally orthogonal edges 504, 506 and contact the front face of the mobile electronic device 500 opposite the face 520 with which the onboard camera 502 is generally aligned. The optical device 700 may include an attachment-inducing structure, repeatedly attachable adhesive, magnet, or the like for securely attaching the optical device 700 to the mobile electronic device 500. For example, optical device 700 may include an adhesive area 702 on the underside of an alignment structure, such as the upper wall 704. As shown, the portion of the upper wall 704 that contacts the mobile electronic device 500 may include the adhesive area 702. The adhesive area 702 can facilitate securement of the optical device 700 to the mobile electronic device 500 during use. In some embodiments, adhesive is applied to the interior of the sidewall 706 of the optical device 700 instead of, or in addition to, the underside of the upper wall 704. In some embodiments, the adhesive chosen for the adhesive area 702 may be a low tack adhesive that does not leave residue on the mobile electronic device 500 when the optical device 700 is removed.

In some embodiments, the optical device 700 may include a magnetic area on the underside of the outer upper wall 704 (e.g., the portion of the upper wall 704 that contacts the mobile electronic device 500). The magnetic area can facilitate securement of the optical device 700 to the mobile electronic device 500 during use, such as when a portion of an edge of the mobile electronic device 500 is metallic. In some embodiments, the interior of the sidewall 706 of the optical device 700 may be metallic instead of, or in addition to, the underside of the upper wall 704.

FIGS. 8A and 8B illustrate an embodiment of an optical device 800 that may include an alignment or attachment structure, such as an upper wall 804, a sidewall 806, and an optical component 810 that are similar or identical in many respects to the optical device 700 of FIGS. 7A and 7B. The interior surface of the sidewall 806 that faces a rear face of the mobile device 500 may include a suction cup 802 that facilitates securement of the optical device 800 to the mobile electronic device 500 during use. In operation, a user may advance the optical device 800 toward the mobile device 500 and apply pressure to activate the suction of the suction cup 802. In some embodiments, the suction cup 802 may define an aperture (not shown) or be made of a material that allows the optical component 810 to communicate optically with the onboard camera 502 of the mobile device 500 without obstructing or altering the light that passes from the optical component 810 to the onboard camera 502.

FIGS. 9A-9E and 10A-10E illustrate removably attachable optical devices with one or more (e.g., two or three, etc.) moveable (e.g., pivoting and/or retracting) securement members. These embodiments can include a first stage or position (as shown in FIGS. 9A and 10A) in which the device 900 or 1000 has a smaller size or profile to facilitate ease of storage, transportation, and/or handling, and a second stage or position as shown in FIGS. 9C and 10C) in which the device 900 or 1000 has a substantially larger size or profile to increase the span, reach, and/or stability of the device in attaching to a mobile electronic device.

The attachable and removable optical device 900 shown in FIGS. 9A-9E may be removably attached to a mobile electronic device 500. The mobile electronic device 500 may include an onboard camera lens 502. The optical device 900 may an optical component 904, such as a lens, coupled to a plurality (e.g., two) of securement members 922 and 924. The optical component 904 may be configured to focus light from an area generally in front of the optical component 904 onto the onboard camera lens 502 when the optical device 900 is installed on the mobile electronic device 500. In some embodiments, the optical component 904 may be configured to alter the light (e.g., magnify the light, filter the light, etc.). Any other type of optical component, such as any optical disclosed in this specification, can be used.

The optical device 900 may be compact when not in use, with the securement members 922, 924 being oriented generally parallel with each other or generally in contact with each other or substantially near each other in a first position, as illustrated in FIG. 9A. Prior to attachment of the optical device 900 to the mobile electronic device 500, the securement members 922, 924 may pivot or otherwise move with respect to each other such that the securement members 922, 924 may be configured to each contact a different edge of the mobile electronic device 500, or otherwise be spaced apart from each other at contact points on the mobile electronic device 500. For example, as illustrated in FIG. 9B, the securement member 922 may be rotated or pivoted with respect to securement member 924. As illustrated in FIG. 9C, such rotation or pivoting of securement member 922 may position the securement member 922 to contact a first edge 504 of the mobile electronic device 500, while securement member 924 is positioned to contact a second edge 506 of the mobile electronic device 500. The first edge 504 may be generally orthogonal to the second edge 506. Each securement member 922, 924 may include a clip 944 configured to receive and retain an edge 504 or 506 of the mobile electronic device 500, thereby securing the optical device 900 to the mobile electronic device 500. The use of two securement members 922, 924 in contact with the generally orthogonal edges 504, 506 can serve to accurately and repeatedly position the lens 904 over the onboard camera lens 502 of the mobile electronic device 500, as seen in FIG. 9E.

In some cases, a mobile electronic device 600 may include an onboard camera lens 602 generally positioned in a middle region that is generally equidistant from two generally parallel edges 604, 608, as shown in FIGS. 10A-10E, rather than an onboard camera lens 502 that is generally closer to one edge 504 of the mobile electronic device 500 than a generally parallel edge 508, as shown in FIGS. 9A-9E. As a result, a securement member may be substantially longer in an optical device 1000 configured for use with such a communication device 600. In some embodiments, as illustrated, an optical component 1000 can include three securement members 1022, 1024, 1026 to provide additional support to an optical component 1004 due to the distance from either of the generally parallel edges 604, 608 and the length of a securement member 1022 configured grasp one edge 604. In some embodiments, one or more securement members 1022, 1024, 1026 may be extendable or retractable (e.g., telescoping members with overlapping sections that may slide inward or outward relative to each other) and/or positioned in sliding relationship to one another, thereby facilitating use with devices of varying widths and/or facilitating ease of storage when the securement members are retracted.

Figure 11:
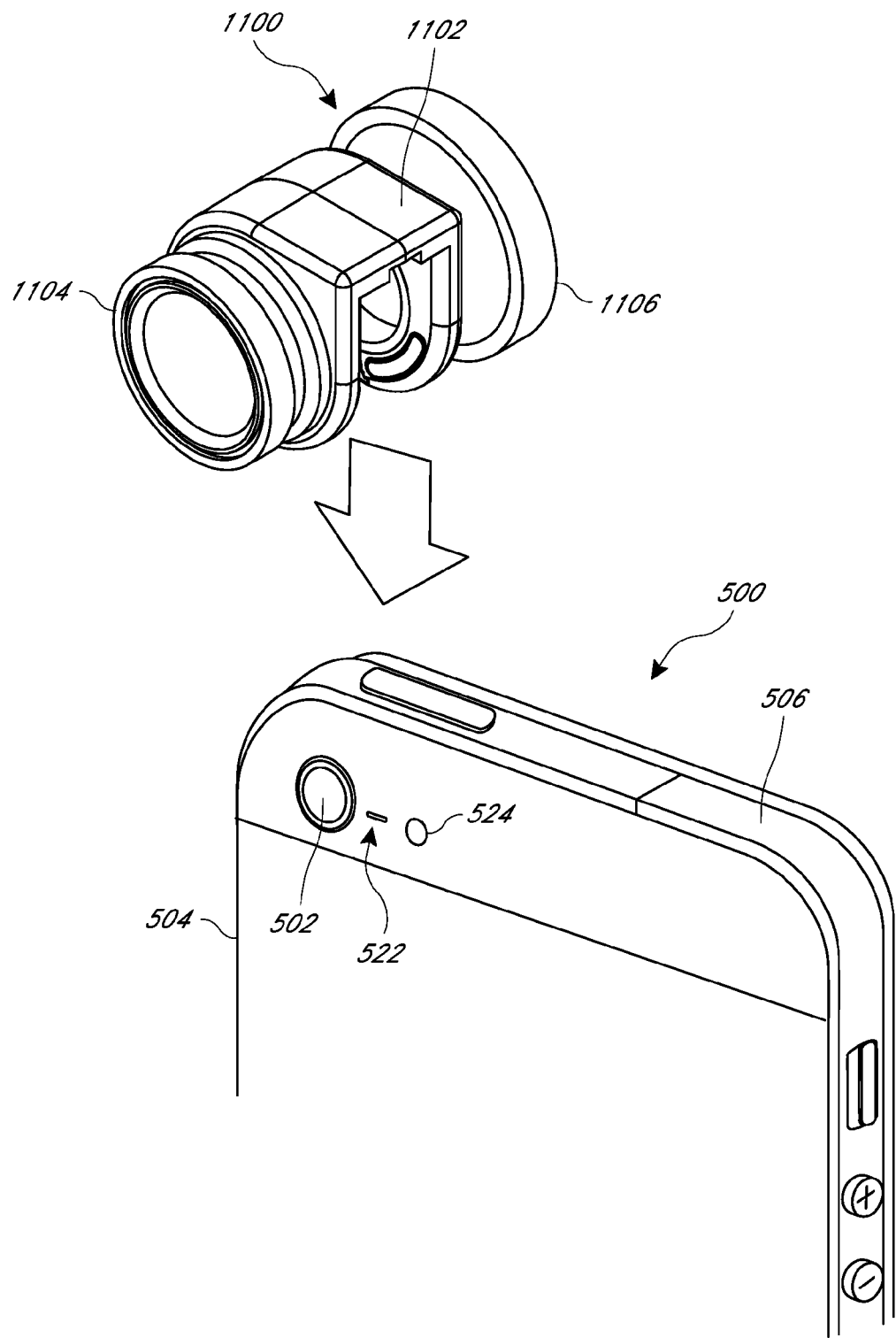
FIG. 11 illustrates a rear perspective view of an example of a mobile electronic device with a removable optical device about to be attached.

FIG. 11 illustrates a mobile electronic device 500 includes an onboard camera lens 502 in close proximity with other input or output devices, such as a flash 524 and a microphone 522. It can be advantageous to permit information or energy to be conveyed to and/or from one or more input or output devices along a pathway that is generally open or that has diminished obstruction. In this example, a plurality (e.g., two, three, or more) of input and/or output devices 502, 522, 524 are positioned near a corner of the mobile device 500 where first and second generally orthogonal sides 504, 506 generally converge. The first and second sides 504, 506 can be located on generally opposing sides of the mobile electronic device 500 from third and fourth generally orthogonal sides 508, 510 (as shown in, e.g., FIG. 7B), thereby positioning the input or output devices a substantial distance away from third and fourth generally orthogonal sides. The first side 504 and the third side 508 can be generally parallel to each other, and the second side 506 and the fourth side 510 can be generally parallel to each other.

An optical device 1100 can be removably attached to the mobile electronic device 500 using any or all of the features, structures, and/or steps illustrated or described herein or in U.S. Pat. No. 8,279,544, which is hereby incorporated by reference in its entirety for all that it discloses. The optical device 1100 can include an energy conveying path that is generally open and generally unobstructed for assisting in the transmission of energy to or from an input and/or output device on a mobile electronic device while generally preserving the quality of a signal, image, or information being transmitted by such energy. Examples of transmitted energy conveyed to or from mobile electronic devices include acoustic sound waves, visible light, or other electromagnetic energy. The optical device 1100 can include a mounting portion 1102 and one or more lens portions 1104, 1105.

Figure 12A:
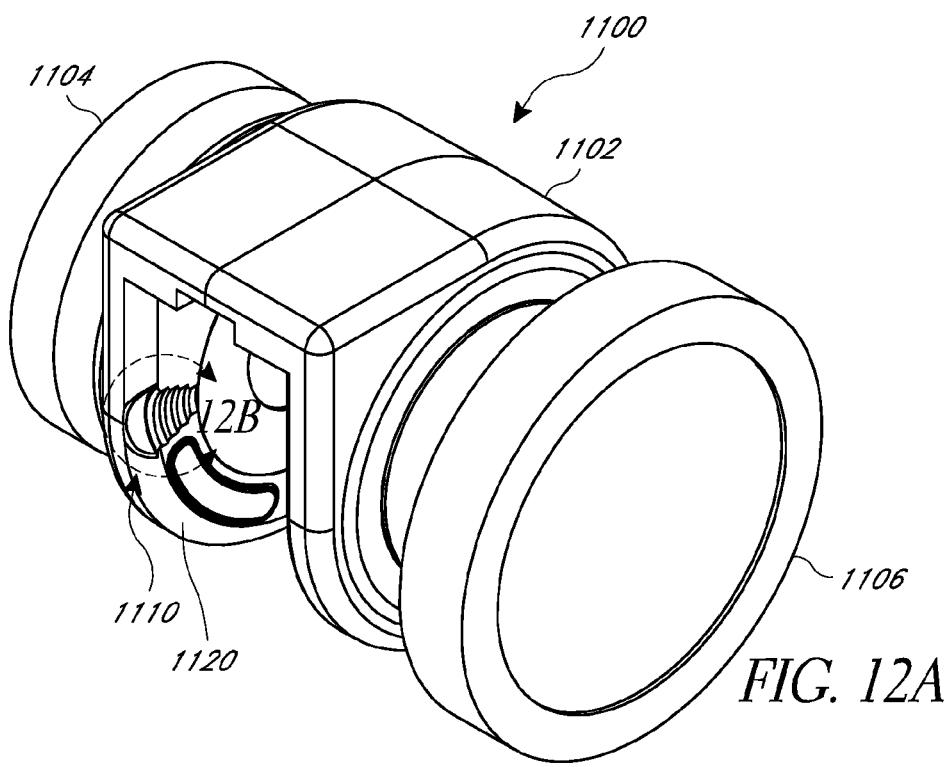
FIG. 12A illustrates a perspective view of an optical device.
Figure 12B:
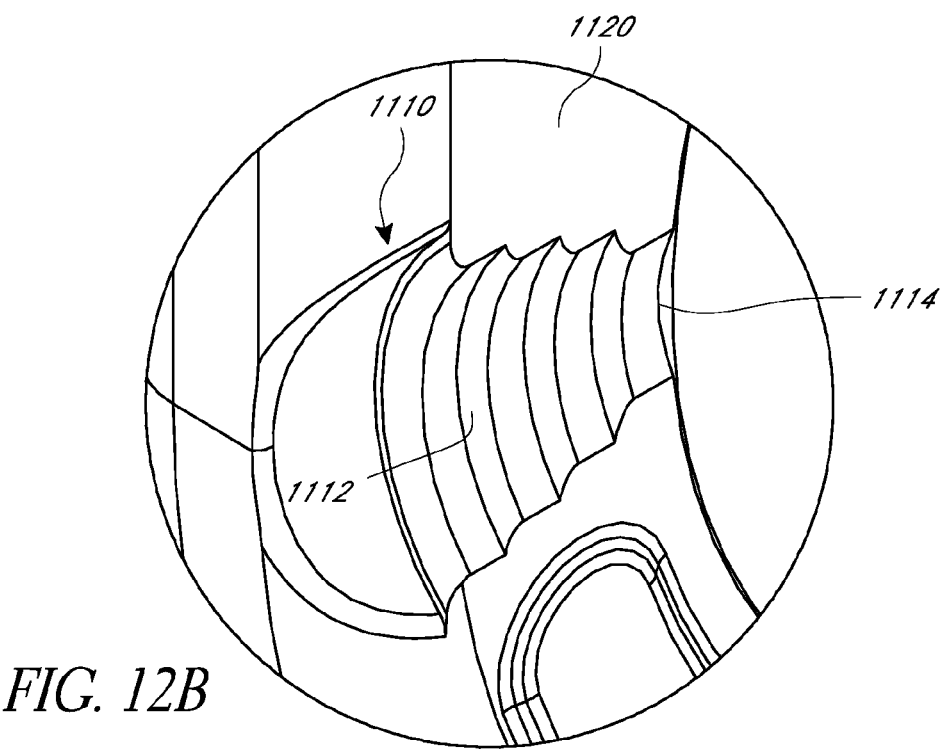
FIG. 12B illustrates a close-up perspective view of a portion of the optical device of FIG. 12A.

In some embodiments, as illustrated in FIG. 12A, an energy conveying path 1110, such as a sound path in the form of a channel or groove, may be positioned on an inner surface 1120 of the mounting portion 1102. The energy conveying path 1110 permits sound waves to travel from the environment in which the mobile electronic device 500 is being used to an onboard microphone 522. In some embodiments, the conveying path 1110 can generally extend from a region outside of the profile of the optical device 1100 to a region inside of the profile of the optical device 1100 by way of a generally direct, generally unobstructed path. As illustrated, the conveying path 1110 can be open on one or more axial sides and closed on one or more axial sides.

As illustrated in FIGS. 12A, 12B, 13, 14A and 14B, in some embodiments the conveying path 1110 can comprise a first side or end that is wider than a second side or end. In some embodiments, as shown, the conveying path 1110 can extend in a direction that is not generally co-linear, co-axial, or parallel with the optical axis of an optical component 1104; rather, the conveying path 1110 can extend in an oblique direction with respect to a planar face (e.g., the rear face) of a mobile device 500 when the optical device 1100 is removably attached thereto. The inner surface 1112 of the conveying path 1110 can comprise a generally tapered region for focusing the conveyed energy down to a smaller region. When the optical device 1100 is removably attached to a mobile electronic device 500, a proximal region 1114 of the conveying path 1110 is configured to be near, adjacent to, or in contact with a microphone, or the face of the mobile device in which a microphone is positioned. The proximal region 1114 can be positioned on the mounting portion 1102 at a location that is near or adjacent to an optical aperture 1150 in the optical device 110 for conveying light from an optical component 1104 or 1106 to the onboard camera 502 when the optical device 1100 is removably attached to a mobile electronic device 500.

Figure 13:
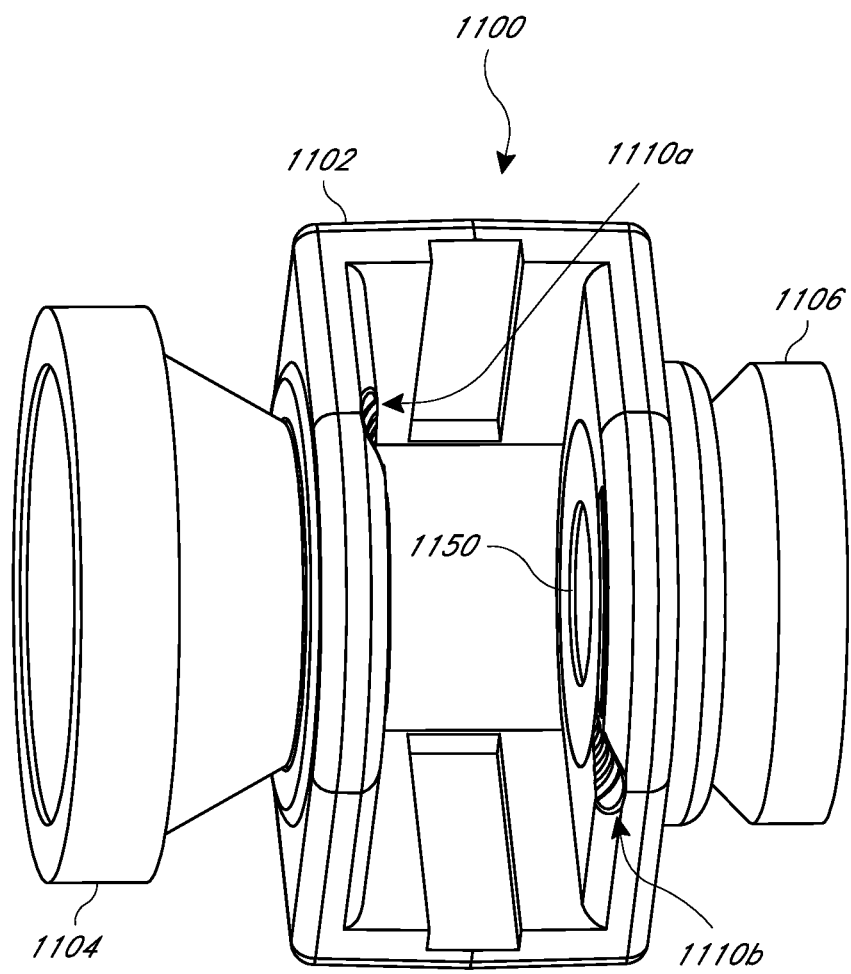
FIG. 13 illustrates a perspective side view of the optical device of FIG. 12A.
Figure 14A:
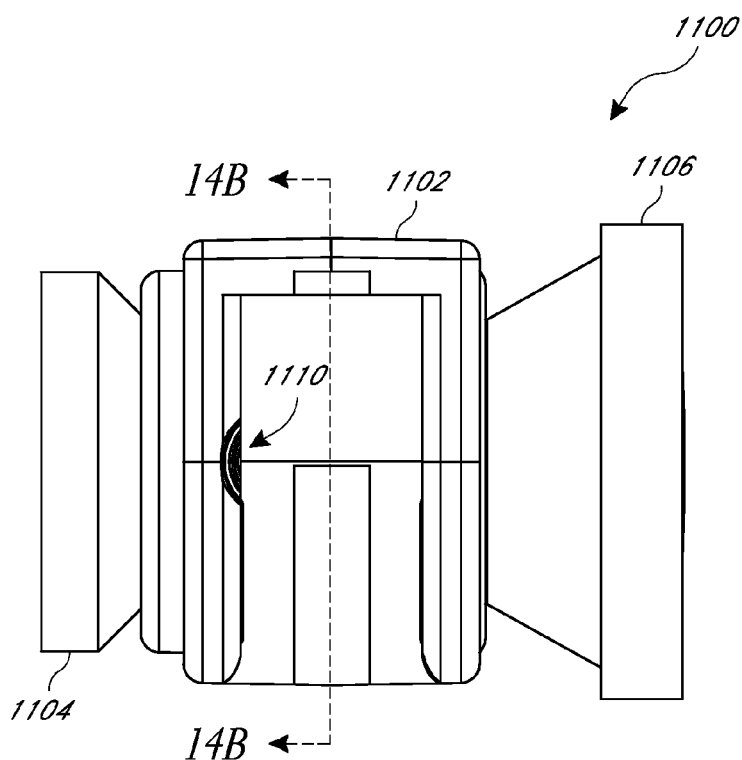
FIG. 14A illustrates a side plan view of the optical device of FIG. 12A.
Figure 14B:
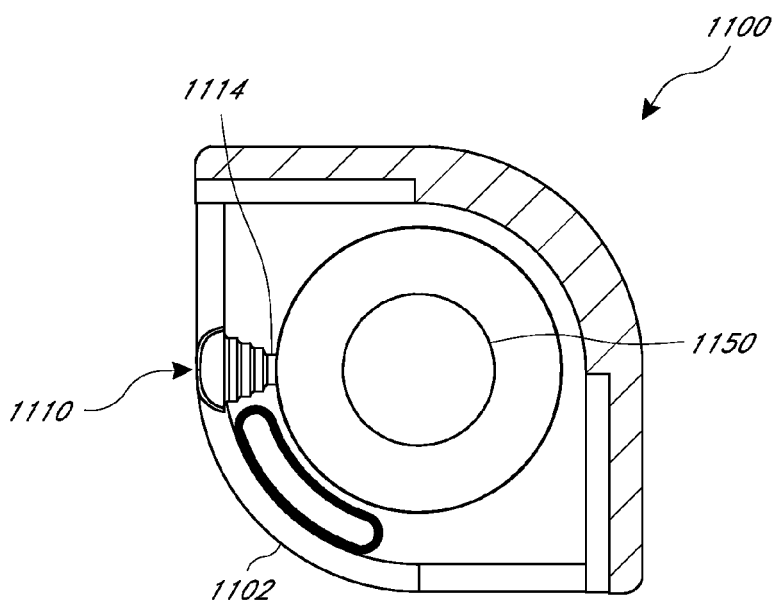
FIG. 14B illustrates a cross-sectional view of the optical device of FIG. 12A, taken along the line 14B-14B of FIG. 14A.

In some embodiments, as shown in FIG. 13, an optical device 1100 may include multiple (e.g., two) energy conveying paths 1110a, 1110b. For example, if the optical device 1100 is configured with two optical components 1104, 1106 that may be used with the onboard camera 502 of a mobile device 500, then a separate energy conveying path 1110a, 1110b may be included in the mounting portion 1102 for each optical component 1104, 1106 respectively. When a user attaches the optical device 1100 such that optical component 1104 may be used with the onboard camera 502, then energy conveying path 1110a may be positioned to convey energy to and/or from one or more of the input and/or output devices 522, 524. When a user attaches the optical device 1100 such that the other optical component 1106 may be used with the onboard camera 502, then energy conveying path 1110b may be positioned to convey energy to and/or from one or more of the input and/or output devices 522, 524. In some embodiments, multiple energy conveying paths (not shown) may be included on a single interior surface of the mounting portion 1102 for conveying energy to two or more different output and/or output devices when a particular optical component 1104 or 1106 is being used or positioned for use.

Figure 15:
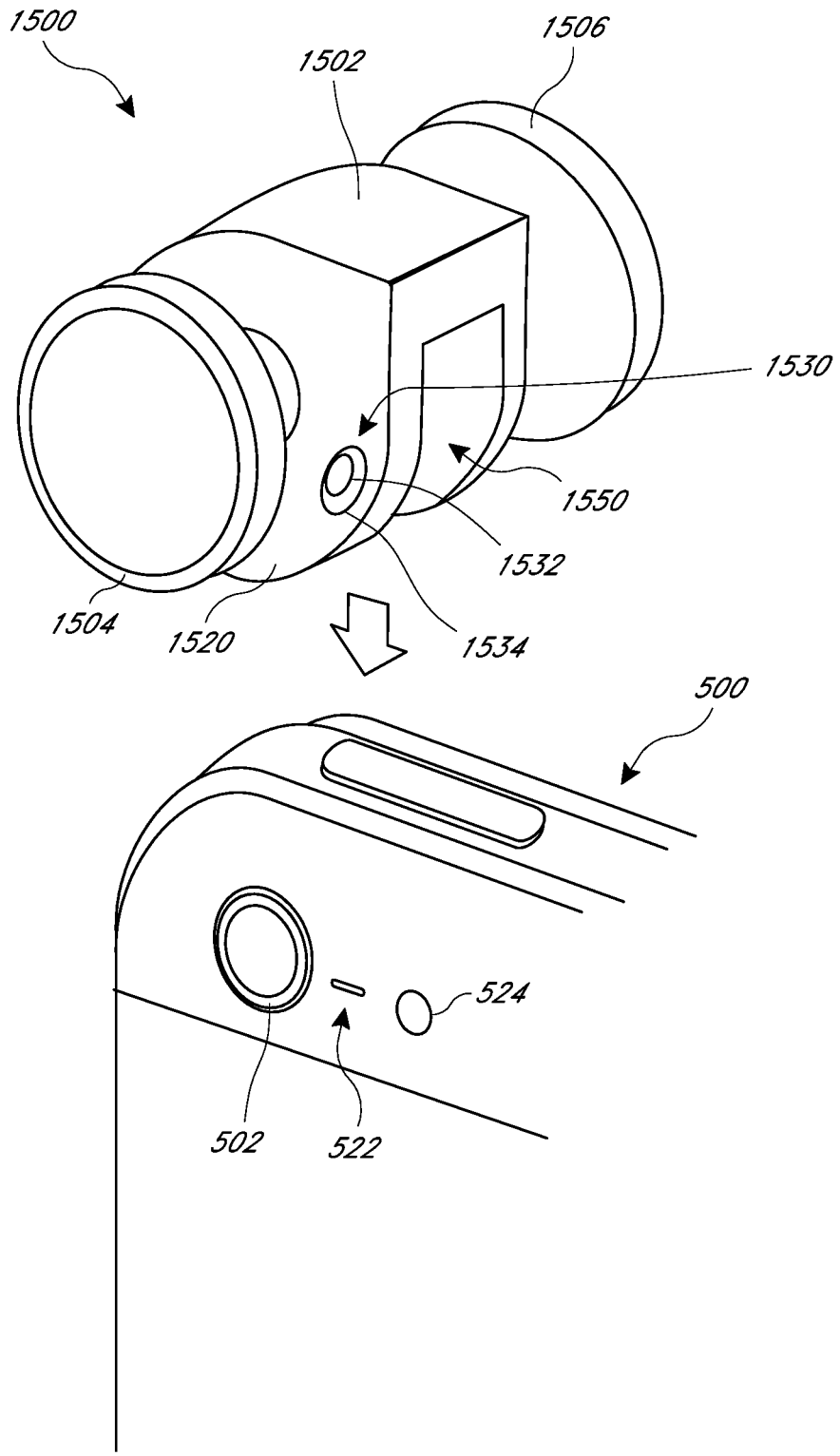
FIG. 15 is a perspective view of another example of an optical device that is about to be attached to a mobile electronic device.
Figure 16:
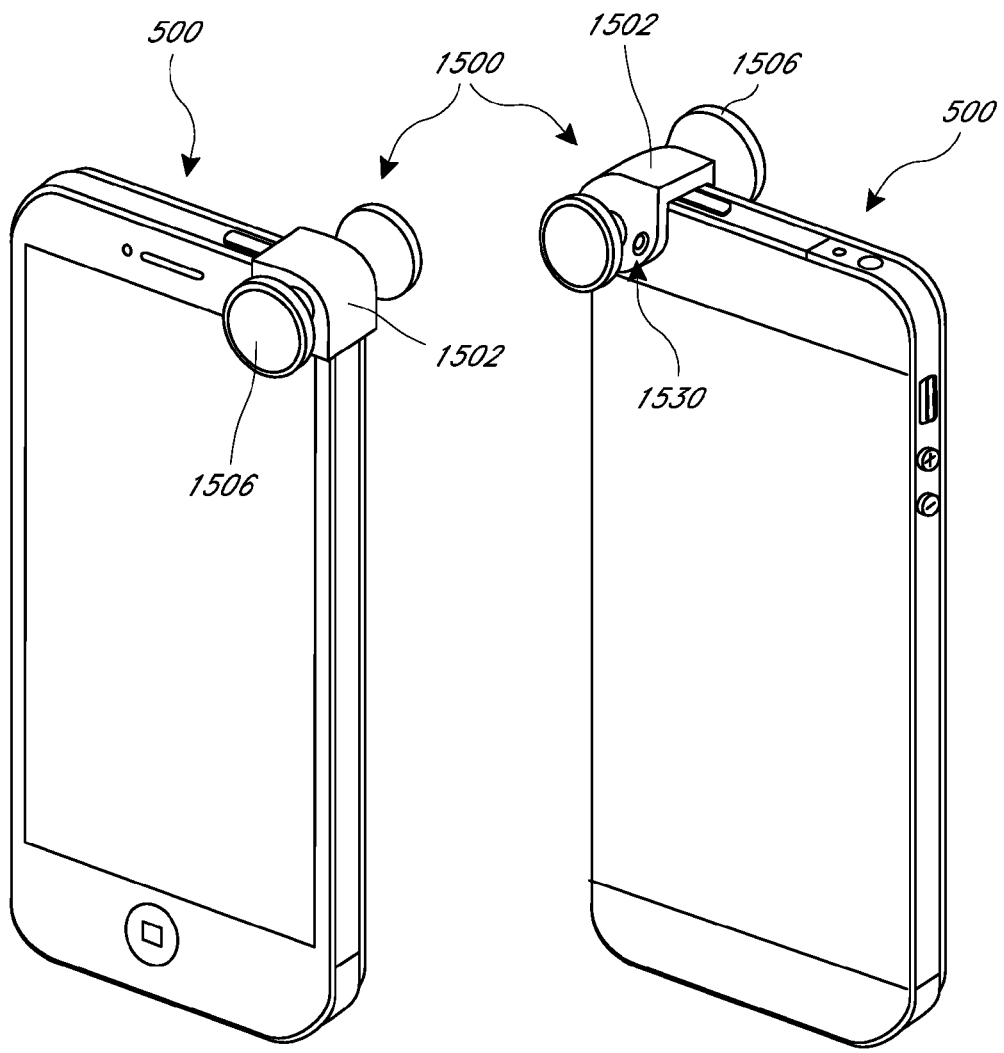
FIG. 16 illustrates front and rear perspective views of the optical device of FIG. 15 removably attached to a mobile electronic device.

Another example of a conveying path is illustrated in FIGS. 15 and 16. This conveying path 1530 is generally closed along at least a portion of its length, or along substantially the entirety of its length, with openings 1534, 1532 on each end of an outer surface 1520 and an inner surface 1550, respectively, of the mounting portion 1502 of the optical device 1500. In the illustrated example, the conveying path 1530 can comprise a tunnel or channel that extends through a wall in the mounting portion 1502 rather than extending along a surface of a wall of the mounting portion 1502. If needed, other appropriately configured energy conveying paths can be provided for other input and/or output devices associated with a mobile electronic device, such as (for example) a light-conveying surface (e.g., a surface that is at least partially translucent or a light tube) or a light-conveying opening. All of the features of each of the embodiments disclosed herein can be used with any embodiments disclosed in this application or in U.S. Pat. No. 8,279,544.

Figures 17A, 17B:
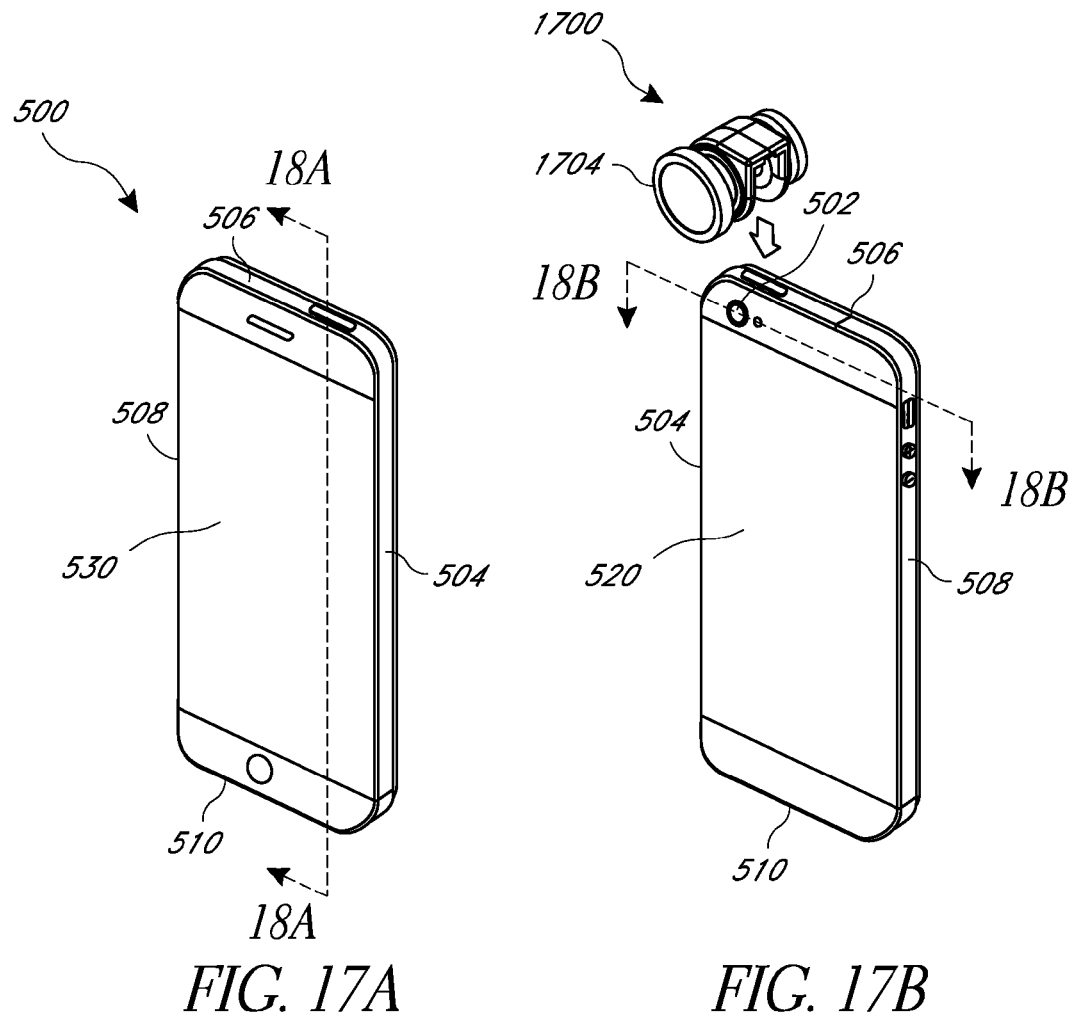
FIGS. 17A and 17B illustrate front and rear perspective views of an example mobile electronic device with an optical device about to be attached.

FIGS. 17A and 17B illustrate an optical device 1700 configured for use with mobile device 500. The optical device 1700 includes one or more optical components, such as lens 1704, that may be tilted (e.g., may not be orthogonal) with respect to the rear face 520 of the mobile device 500 to account for a similar tilt of the onboard camera lens 502. For example, if a removably attachable optical device is attached to the mobile device 500, light passing through an optical component may not be conveyed properly to the onboard camera lens 502 if the onboard camera lens 502 is tilted with respect to the rear face 520. As a result, image quality may be reduced, or the misalignment of the axes of two or more lenses may prevent the capture of a discernible image altogether. It can be advantageous to provide a generally matching tilt to the lens 1704 or other optical component of a removably attachable optical device 1700 in order to generally align the optical or central axis of the onboard camera lens 502 with the optical or central axis of the lens 1704. By generally aligning the axes of the onboard camera lens 502 and the lens 1704 of the optical device 1700, light may be conveyed to the onboard camera lens 502 properly, thereby improving image quality. In some embodiments, a tilt is built into and is a permanent characteristic of the optical device 1700, and in some embodiments the tilt is optional and/or user-adjustable.

Figure 18A:
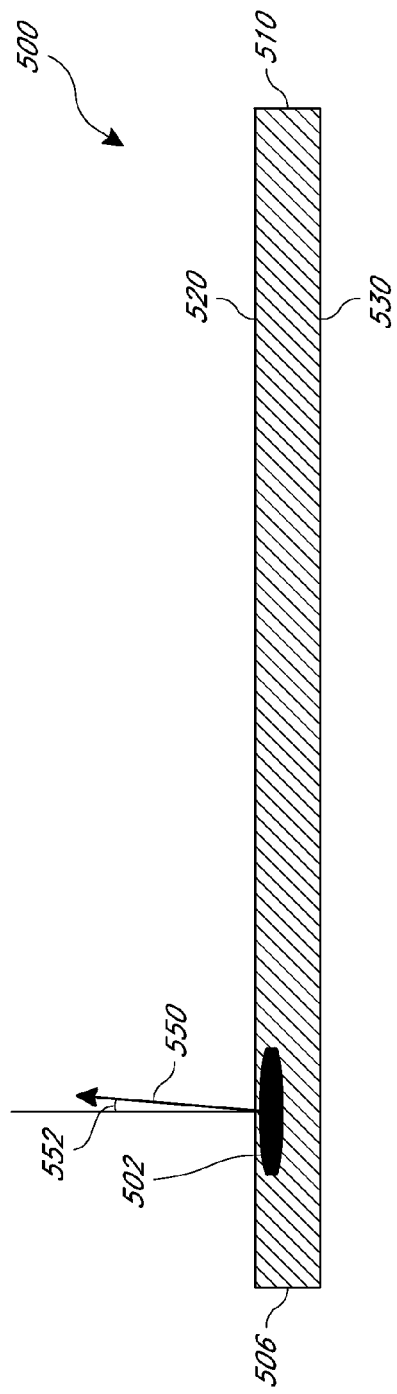
FIG. 18A illustrates a cross-sectional side view of a mobile electronic device, taken along the 18A-18A line of FIG. 17A.
Figure 18B:
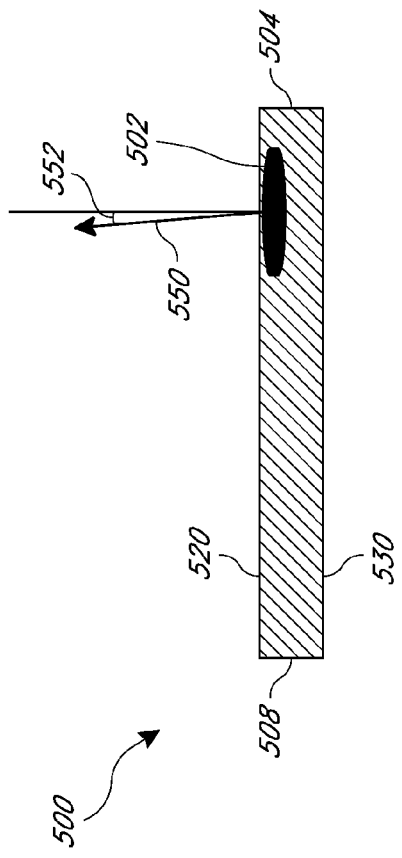
FIG. 18B illustrates a cross-sectional top-down view of a mobile electronic device, taken along the 18B-18B line of FIG. 17B.

FIGS. 18A and 18B illustrate cross-sectional views of the mobile electronic device 500. The onboard camera lens 502 may be positioned on a planar face 520 of the mobile electronic device 500 or within the mobile electronic device 500 (e.g., between the planar faces 520, 530). As seen in FIG. 18A, the optical axis or central axis of the onboard camera lens 502 may not be orthogonal or generally orthogonal to the planar face 520. Rather, the lens 502 may be tilted such that the optical axis of the lens 502 is offset at an angle 552 (e.g., about 2 degrees) from orthogonal to the planar face 520. In some embodiments, the amount of tilt can be very small, such as less than or equal to about 5 degrees, or at least about 1 degree and/or less than or equal to about 2 degrees. In FIG. 18A, the onboard camera lens 502 is tilted away from side 506 (which is closest to the onboard camera), and towards side 510 (which is farthest from the onboard camera lens), in either or both dimensions, leaning generally toward the middle bottom region of the mobile electronic device 500.

As seen in FIG. 18B, the onboard camera lens 502 may be tilted away from side 504 (which is closest to the onboard camera lens), and towards side 508 (which is farthest from the onboard camera lens) of the mobile electronic device 500. The onboard camera lens 502 is tilted such that the optical axis of the camera lens 502 is offset at an angle 552 from orthogonal to the planar face 520. In some cases, the optical axis of the onboard camera lens 502 may tilted away from a corner or from two generally converging sides. For example, the central or optical axis 550 of the camera lens 502 may be tilted away from a corner or convergence of sides 504, 506 and towards an opposite corner or the convergence of sides 508, 510.

Figure 19A:
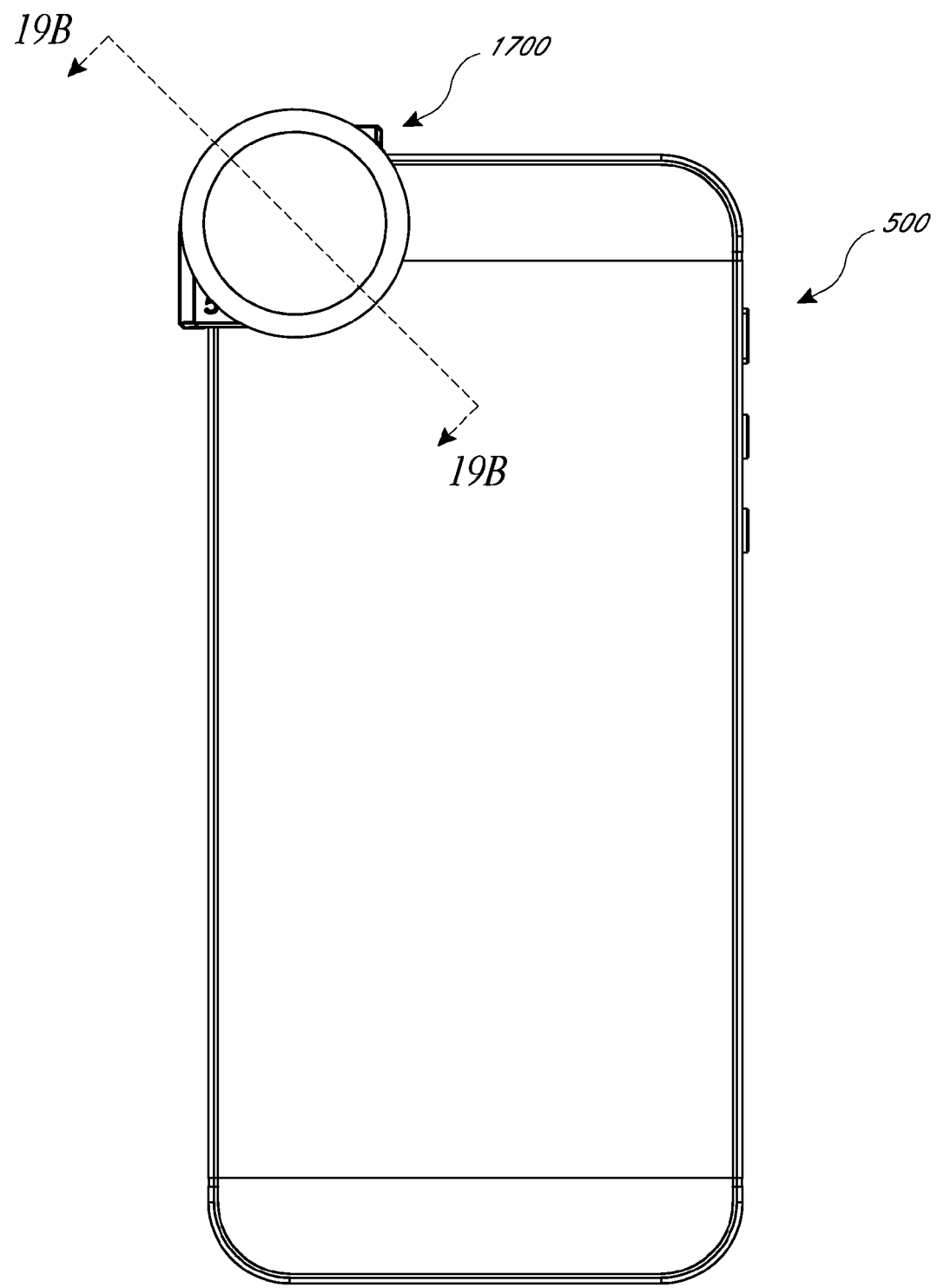
FIG. 19A illustrates a rear plan view of a mobile electronic device with the optical device of FIGS. 17A-17B removably attached.
Figure 19B:
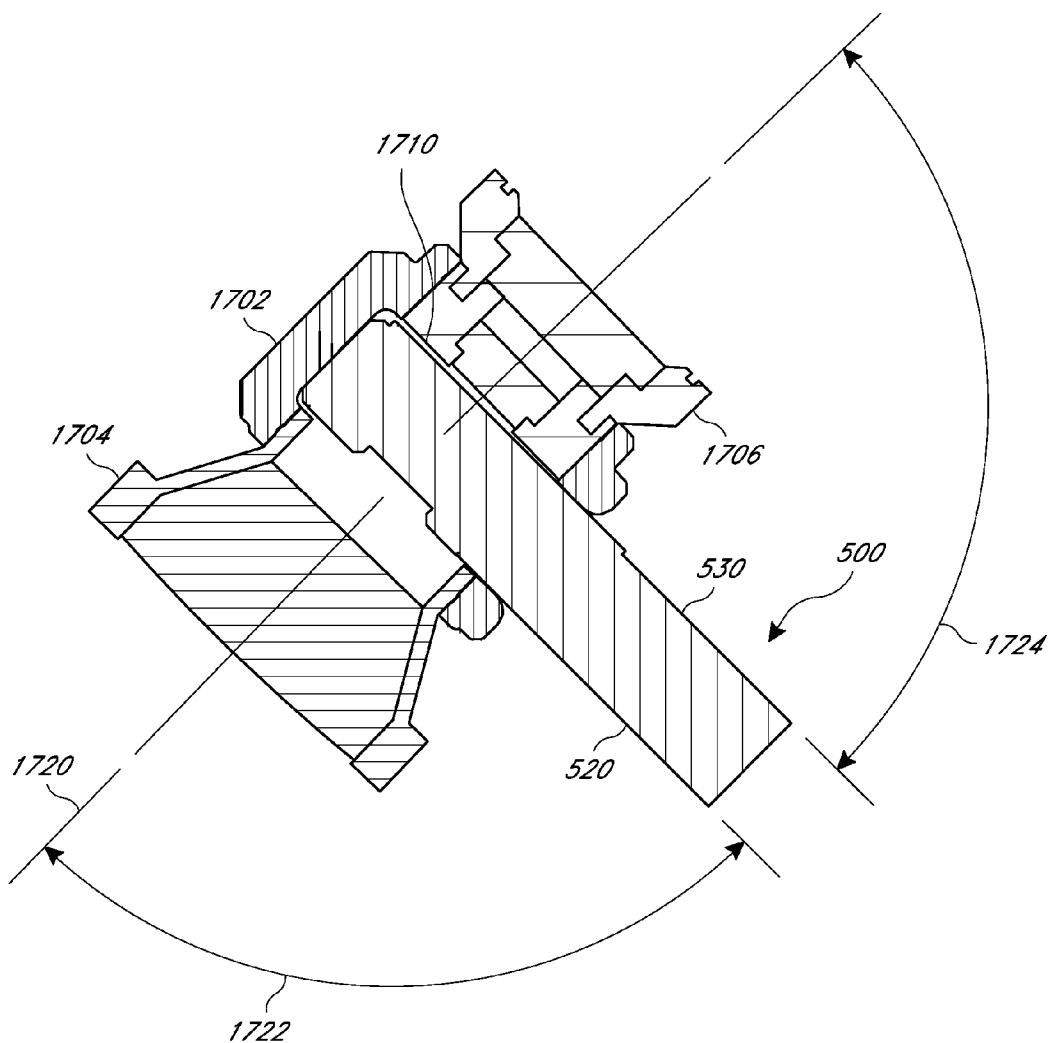
FIG. 19B illustrates a cross-sectional view of an optical device removably attached to a mobile electronic device, taken along the line 19B-19B line of FIG. 19A.

As illustrated in FIGS. 19A and 19B, one or more lenses 1704, 1706 of a removably attachable optical component 1700 may be tilted to account for the tilt of the onboard camera lens 502 of the mobile electronic device. In some embodiments, the lenses 1704, 1706 may be positioned within the retaining clip 1702 such that they are generally co-axial with the onboard camera lens 502 when in use. For example, lens 1704 (or some other optical component) may be positioned within the retaining clip 1702 such that its optical axis 1720 is tilted at an angle 1722 to the planar face 520 of the mobile electronic device 500. The angle 1722 may be generally equivalent to an angle of the optical axis of the onboard camera lens 502 with respect to the planar face 520. In multi-component or multi-lens embodiments, such as the optical device 1700 shown in FIG. 19B, each lens 1704, 1706 may be tilted. In some embodiments, the amount of tilt may be fixed by the retainer clip 1702 and not adjustable by a user, or the lens may be adjustable by the user to account for manufacturing tolerance variations in the tilt of individual onboard cameras in mobile electronic devices. In some embodiments, the amount of tilt in either or both lenses 1704, 1706 can be very small, such as less than or equal to about 5 degrees, or at least about 1 degree and/or less than or equal to about 2 degrees.

The tilt of a lens of the lens component 1700 may create a void between a portion of the lens and a planar face of the mobile electronic device 500. For example, if lens 1706 were positioned such that its optical axis were orthogonal to planar face 530 (or planar face 520 when in use), an internal surface of lens component 1700 would contact or be parallel to planar face 530. However, because the lens 1706 is tilted away from orthogonal at angle 1724, a void 1710 is present between a portion of the lens 1706 and planar face 530. A similar void may be present between lens 1706 and planar face 520 when lens 1706 is in use, or between lens 1704 and planar face 520.

In some embodiments, the lens 1704 may be coupled to the retainer clip 1702 such that a user can manually adjust (e.g., tilt, swivel, or otherwise move) the lens further with respect to the planar face 520. Manual adjustments may be useful to address manufacturing differences or tolerances in the location, alignment, and/or tilt of the onboard camera lens 502 of the mobile electronic device 500. For example, a lens 1704 may be coupled to a retainer clip 1702 to permit manual adjustments using any or all of the features, structures, and/or steps illustrated or described in U.S. Pat. No. 8,279,544.

Figure 20C:
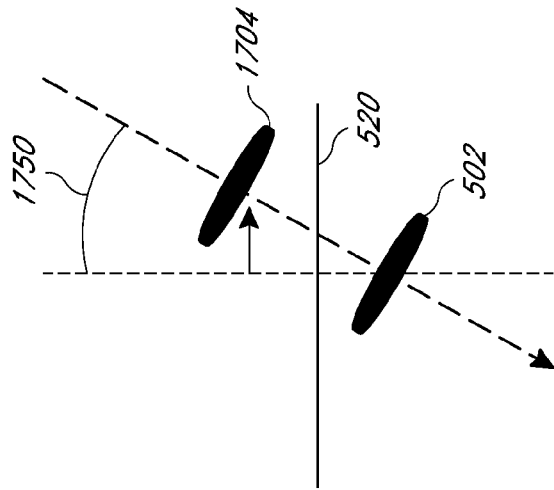
FIGS. 20A-20C illustrate the shifting or lateral translation of the position of a lens of the optical device in order to generally align its optical axis with that of an onboard camera lens when both the optical device and the onboard camera lens are tilted.
Figure 20B:
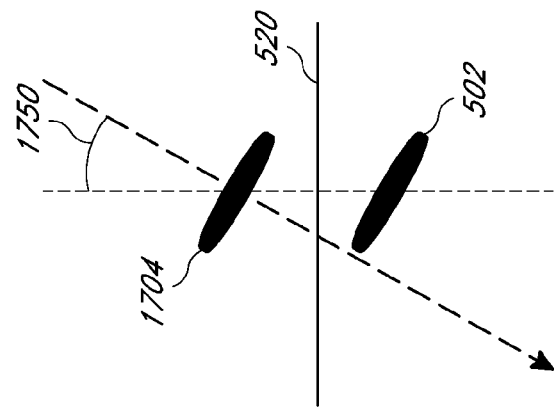
Figure 20A:
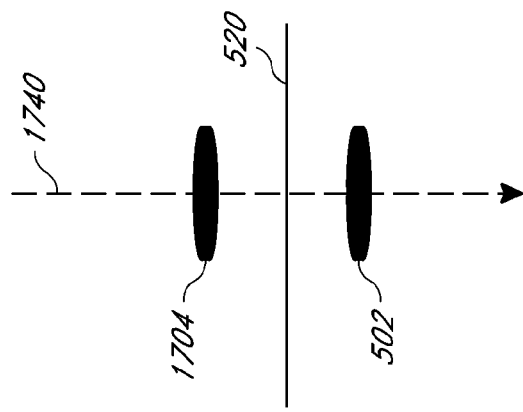

As shown in FIG. 20A, the onboard camera lens 502 may be located beneath a planar face 520 of the mobile electronic device. When the lens component 1700 is removably attached to the mobile electronic device, the lens that is to be used (e.g., lens 1704) may contact the planar face 520 or be positioned above it. In either case, the lens 1704 may not be in contact with the onboard camera lens 502 (e.g., there may be a distance between the lens 1704 and the onboard camera lens 502). When both the lens 1704 and the onboard camera lens are positioned orthogonal to the planar face 520, their optical axes 1740 may be generally aligned.

As shown in FIG. 20B, when both the lens 1704 and the onboard camera lens 502 are tilted with respect to the planar face 520, such as at angle 1750, their optical axes are no longer in alignment. As a result, light may not be conveyed properly from the lens 1704 to the onboard camera lens 502, or in some cases light may not be conveyed to the onboard camera lens 502 at all.

Advantageously, the lens 1704 may be positioned within the retainer clip 1702 such that its center point is shifted or geometrically translated with respect to the planar face 520 and the center point of the onboard camera lens 502. The attachable lens 1704 is not overlaid symmetrically above the onboard camera lens 502 along any line orthogonal to the rear face 520 of the mobile electronic device, but is rather spaced away from a symmetrically overlaid position above the onboard camera lens 502. FIG. 5C illustrates an example of a shifting or geometric translation of the attachable lens 1704 from the onboard camera lens 502. As seen in FIG. 5C, the combination of (1) tilting the lens 1704 at angle 1750 to match the tilt of the onboard camera lens 502 and (2) geometrically translating the position of the lens 1704 with respect to the onboard camera lens 502 can generally align the optical axes of the two lenses 502, 1704 such that light may be conveyed properly from the lens 1704 to the onboard camera lens 502. In multi-lens embodiments of the lens component 1700, each lens 1704, 1706 can be positioned within the retainer clip 1702 such that its center point is geometrically translated with respect to the planar face 520 and the center point of the onboard camera lens 502 when it is in use.

Figure 21:
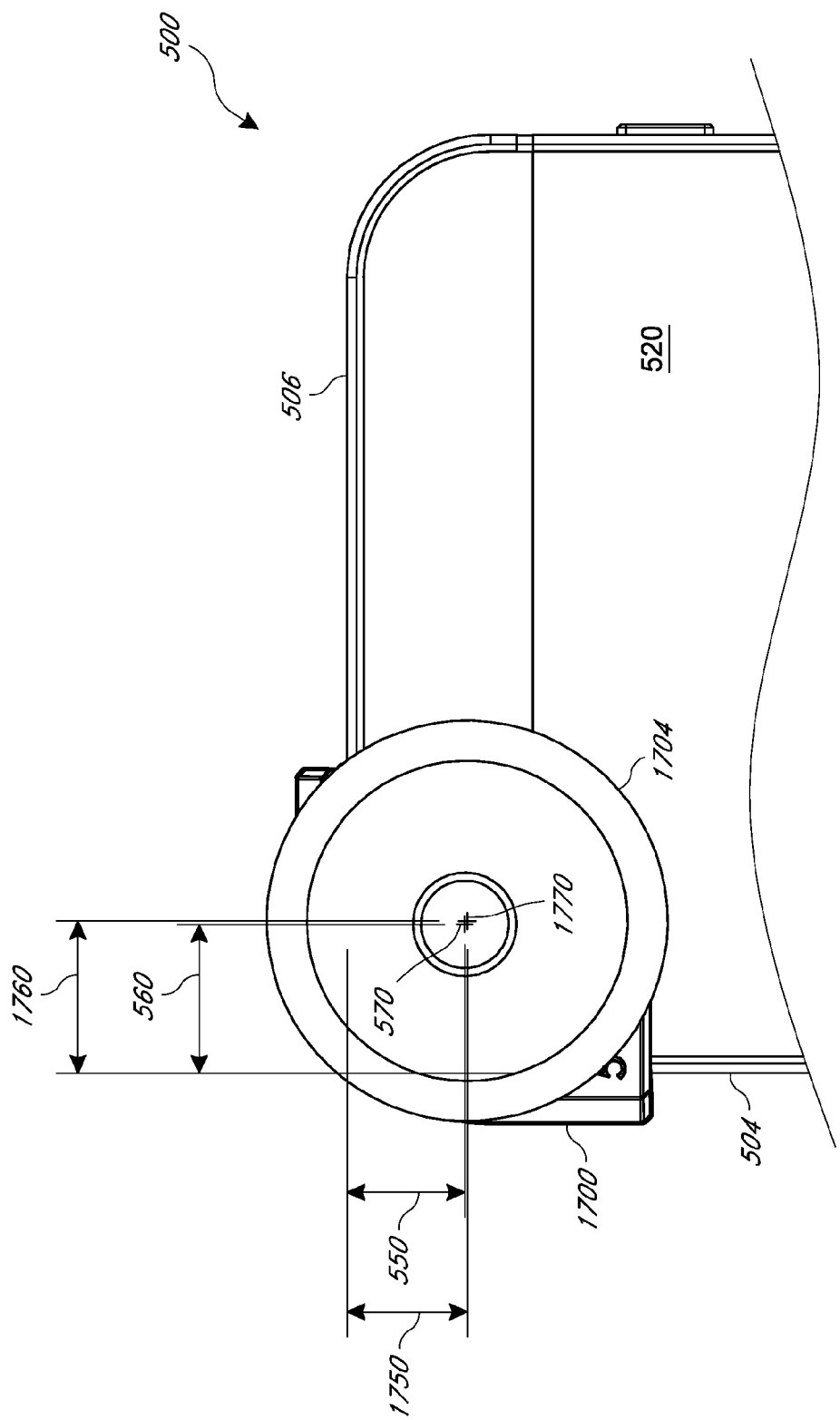
FIG. 21 illustrates a close-up view of an optical device removably attached to a mobile electronic device.

FIG. 21 illustrates an example of the lens 1704 of the removably attachable lens component 1700 geometrically translated or otherwise positioned offset from the onboard camera lens 502 (not shown). The center point of the onboard camera lens 502, indicated by crosshair 570, is distance 550 from edge 506 of the mobile electronic device 500, and distance 560 from edge 504. The center point of lens 1704 of the lens component 1700, indicated by crosshair 1770, is distance 1750 from edge 506, and distance 1760 from edge 504.

In some embodiments, the distance 1750 is not the same as the distance 550. Distance 1750 may be greater than or less than distance 550, depending upon the direction that the onboard camera lens 502 and lens 1704 are tilted with respect to planar face 520. In some embodiments, the difference between the distance 550 and the distance 1750 is very small, such as less than or equal to about 3 mm, or at least about 1 mm and/or less than or equal to about 2 mm. The magnitude of the difference between distances 1750 and 550 may be a function of the degree to which the camera lens 502 and lens 1704 are tilted. Generally, a greater angle between the optical axis of the onboard camera lens 502 and an axis orthogonal to the planar face 1614 will require a larger difference between distances 1750 and 550. The larger distance can keep the optical axes of the camera lens 502 and lens 1704 aligned even though both the onboard camera lens 502 and lens 1704 are tilted. Similarly, distance 1760 may be greater than or less than distance 560, and the magnitude of the difference may also be a function of angle 552 (illustrated in FIG. 18A).

Figure 22C:
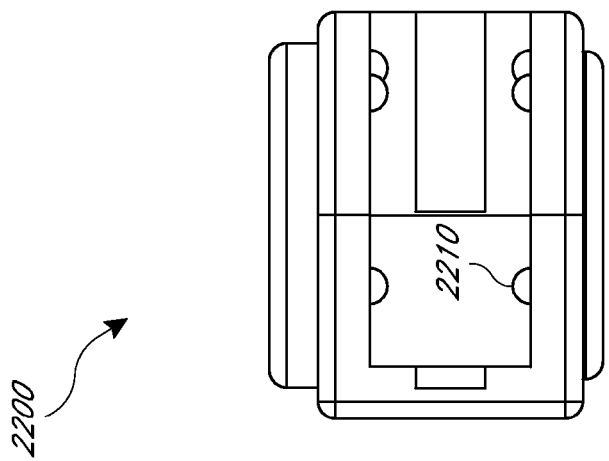
FIGS. 22A-22C illustrate an optical device in several different views.
Figure 22B:
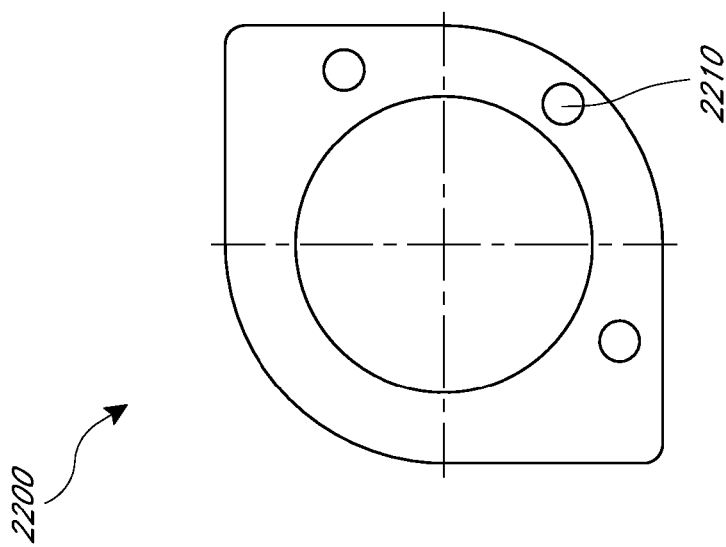
Figure 22A:
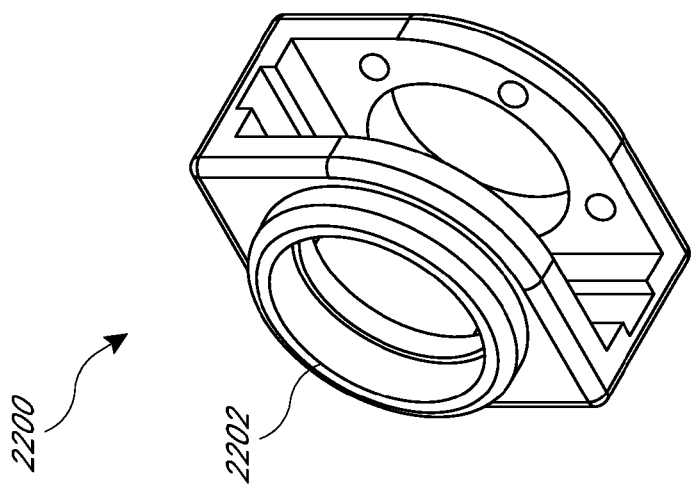

FIGS. 22A, 22B and 22C illustrate several views of an optical device 2200. The optical device 2200 includes features to facilitate ease of attachment to mobile electronic devices of varying thicknesses and/or with surfaces having varying degrees of friction-inducing contact, such as on mobile electronic devices onto which screen protectors (e.g., thin adhesive films that cover display screens) have been applied or mobile electronic devices with protective carrying cases. Such screen protectors or protective cases can add thickness to a mobile electronic device. Optical devices that have been designed to securely fit a mobile electronic device of a particular thickness may not easily be attached to a mobile electronic device onto which a screen protector has been applied.

Optical device 2200 may include one or more apertures 2202 to which a lens or other optical component may be inserted or coupled, as described in greater detail elsewhere herein. In addition, the optical device 2200 includes one or more attachment-facilitating structures 2210 designed to facilitate attachment of the optical device 2200 to mobile devices of varying thicknesses, or to mobile devices to which screen protectors or protective cases have been attached. For example, the structures 2210 may be spring-loaded bearings, ball bearings, rollers, or other thickness-varying or friction-varying components.

Figure 23A:
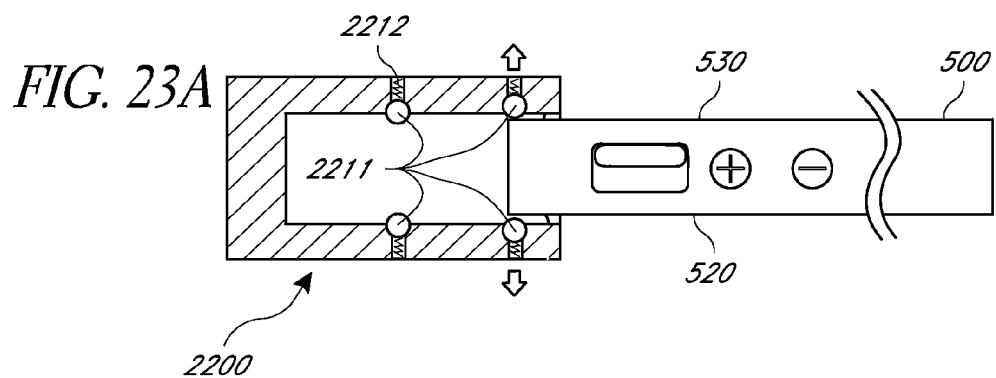
FIGS. 23A-23D illustrated various optical devices being attached to a mobile device.

FIG. 23A illustrates an embodiment of an optical device 2200 with spring loaded bearings 2211 to facilitate attachment to mobile devices of varying thicknesses or varying degrees of friction. One or more bearings 2211 may be placed on the interior of the optical device 2200, and a spring 2212 may be added for each bearing 2211 to provide a wider opening of the optical device 2200 for receipt of a mobile electronic device, while also providing a resilient secure attachment to mobile electronic devices of different thicknesses.

Figure 23B:
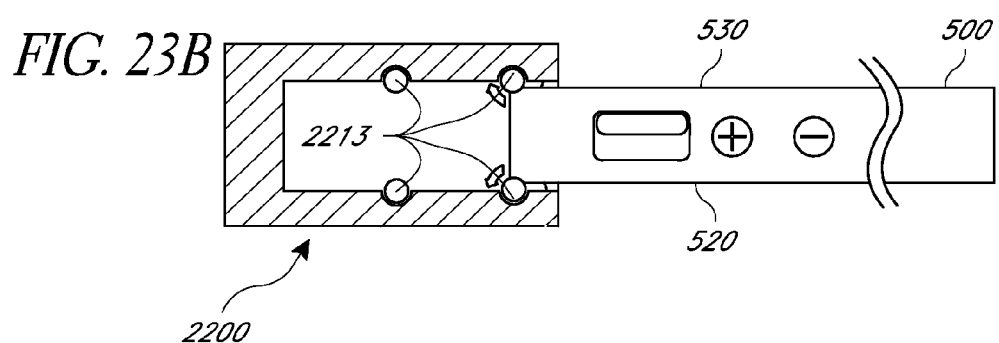

FIG. 23B illustrates an embodiment of an optical device 2200 with one or more ball bearings 2213 without springs. The ball bearings 2213 can facilitate smooth installation and removal of the optical device 2200 even when attached to a mobile electronic device with substantially the maximum thickness that may be used with the optical device 2200.

Figure 23C:
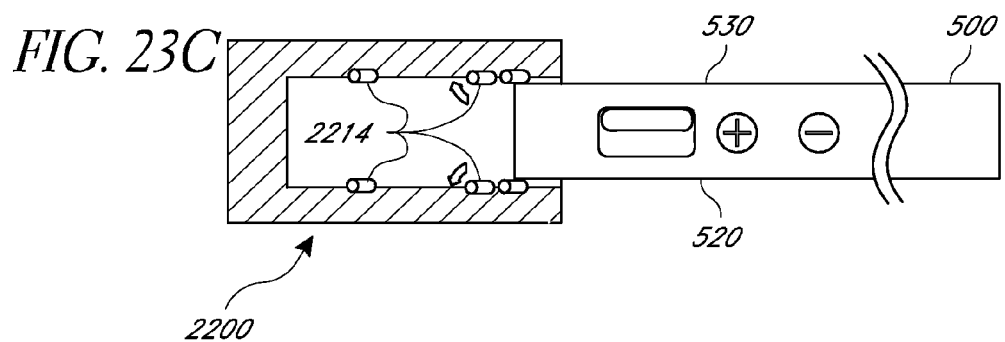

FIG. 23C illustrates an embodiment of an optical device 2200 that includes roller bearings 2214. The roller bearings 2214 may be used with or without springs. The roller bearings 2214 can facilitate smooth installation and removal of the optical device 2200 even when attached to a mobile electronic device with substantially the maximum thickness that may be used with the optical device 2200.

Figure 23D:
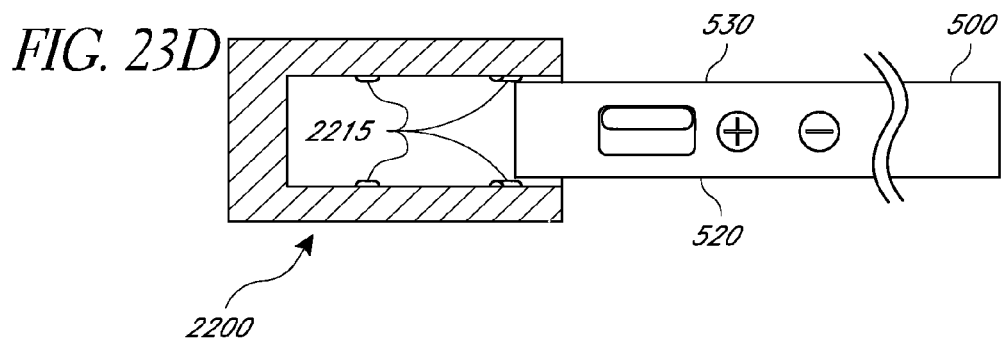

FIG. 23D illustrates an embodiment of an optical device 2200 that includes other types of thickness-varying or friction-diminishing components 2214. The components 2215 may provide a low surface-area contact region, such as one or more stationary feet, bumps, protrusions, or grooves, rather than or in addition to roller bearings, ball bearings, or spring-loaded bearings, and/or a polished or slippery surface. The components 2215 may reduce the surface area that contacts the mobile electronic device. The reduced surface area in contact with the mobile electronic device can therefore reduce the friction that may be experienced when attaching optical device 2200 to, or removing it from, a mobile electronic device with substantially the maximum thickness that may be used with the optical device 2200. In some embodiments, the material of which one or more structures on one or more of the interior surfaces of the optical device 2200 is made can have a substantially lower coefficient of friction than other portions of the optical device 2200.

Figure 24:
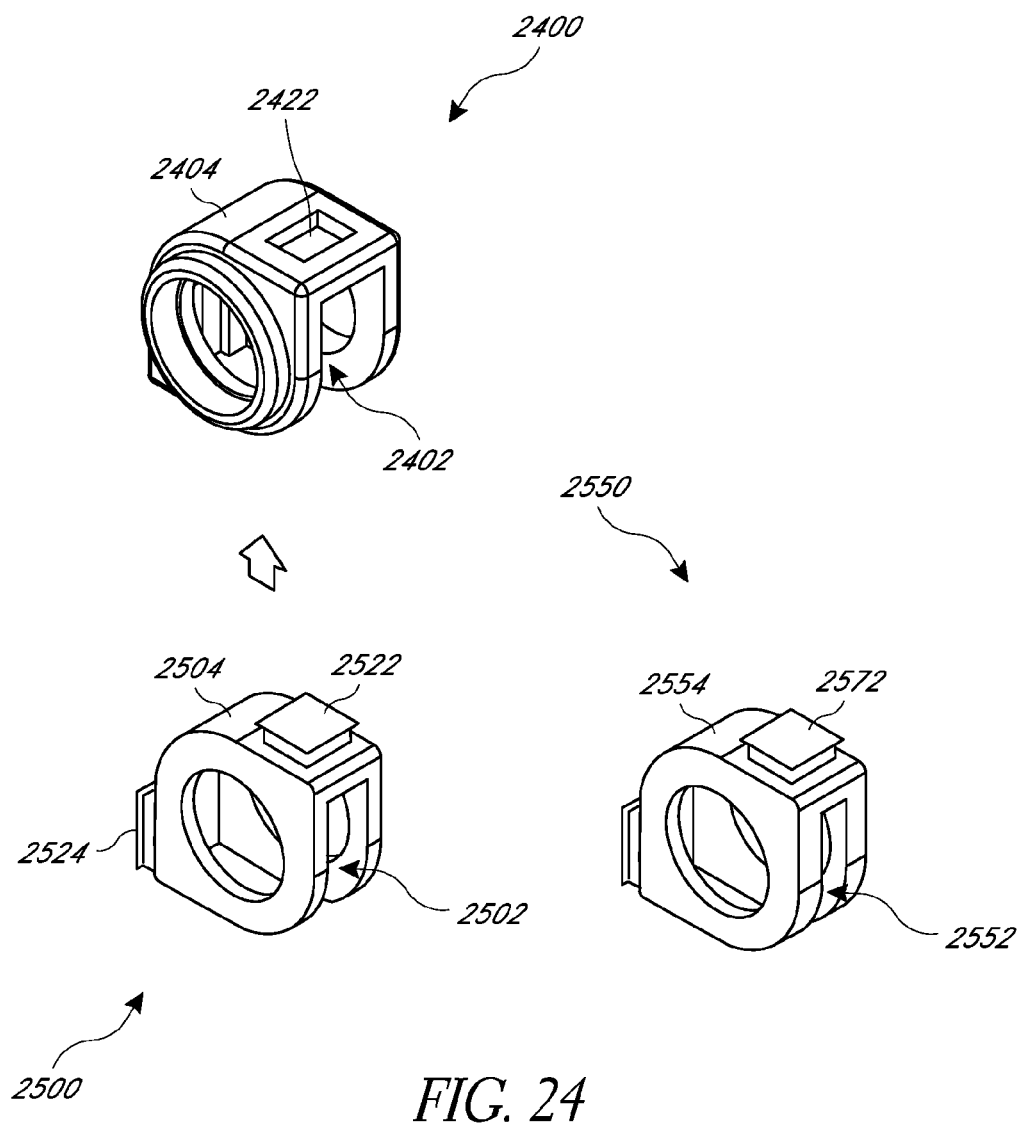
FIG. 24 illustrates various adapter components that may be used with an optical device.
Figure 25:
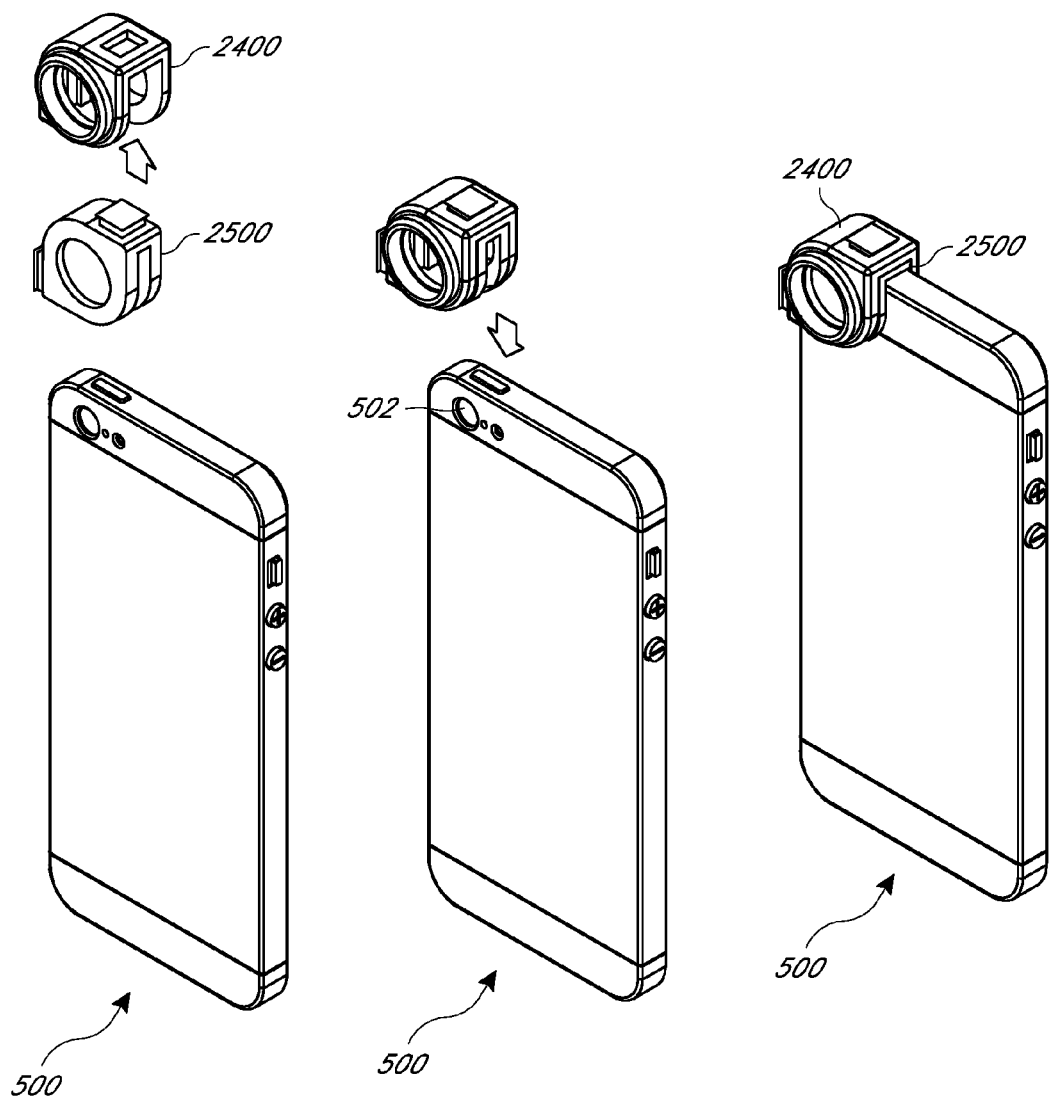
FIG. 25 illustrates an adapter component being used to attach an optical device to a mobile device.

FIGS. 24 and 25 illustrate adapter components 2500, 2550 that may be used with an optical device 2400. The optical device 2400 may be similar to other optical devices described herein. For example, the optical device 2400 may include a clip 2404 for attaching the optical device 2400 to a mobile electronic device, and one or more lenses or other optical components (not shown) which can be generally aligned with an onboard camera lens of the mobile electronic device. The adapter components 2500, 2550 can be used to removably attach an optical device 2400 to different mobile electronic devices of varying thickness, shape, etc. For example, a screen protector may have been applied to a mobile electronic device 500. An adapter component 2500 with a wide interior gap 2502 may be used to attach the optical device 2400 to the mobile electronic device 500. The wide adapter component 2500 may have a clip portion 2504 with an interior channel 2502 formed by two sidewalls of the clip 2504. The channel 2502 may have a width that is generally complimentary to the thickness of the mobile electronic device to which a screen protector has been applied. The exterior width of the adapter component 2500 (and that of other adapter components) may be generally complementary to the width of an interior channel 2402 formed by two sidewalls of the clip portion 2404 of the removably attachable optical device 2400. This can provide a secure attachment of the optical device 2400 to the adapter component 2500, which may be attached to the mobile electronic device.

The adapter component 2500 may include one or more securing structures 2522, 2524 to further facilitate fastening of the optical device 2400 to the adapter component 2500. The optical device 2400 can include an aperture 2422 configured to receive each securing structure of the adapter component 2500. For example, the optical device 2400 may include an opening or slot that can receive securing structure 2522, thereby removably coupling the optical device 2400 to the adapter component 2500.

A narrow adapter component 2550 may be used when attaching an optical device 2400 to a mobile electronic device with a narrower thickness, or to which a screen protector has not been applied. The narrow adapter component 2550 may have a clip portion 2554 with an interior channel 2552 formed by two sidewalls of the clip 2554. The channel 2552 may have a thickness that is generally complimentary to the thickness of the mobile electronic device to which a screen protector has not been applied. The narrow adapter component 2550 may have the same exterior width as the wide adapter component 2500, thereby facilitating use with the same optical device 2400.

As shown in FIG. 25, a user may choose an adapter component 2500 for use with a particular mobile device 500. The user may insert the adapter component 2500 into the interior channel of the optical device 2400, thereby removably coupling the adapter component 2500 to the optical device 2400. The user may then advance the adapter/optical device assembly toward the mobile device, an removably attach the assembly to the mobile device as described herein with respect to other optical device.

Although this invention has been disclosed in the context of a certain preferred embodiments and examples, it will be understood by those skilled in the art that the present invention extends beyond the specifically disclosed embodiments to other alternative embodiments and/or uses of the invention and obvious modifications and equivalents thereof. It is also contemplated that various combinations or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed inventions.

The following is claimed:

1. A removably attachable optical system for use with a mobile electronic device, the optical system comprising:
    a mounting portion configured to be removably attachable to a mobile electronic device, the mounting portion comprising at least a first portion comprising a sidewall and a second portion comprising a second wall, the sidewall comprising a receiving region configured to receive an optical component, and the sidewall being configured to contact a continuous, smooth ring that surrounds an onboard camera of the mobile electronic device and that is permanently affixed to and protrudes rearwardly beyond a rear face of the mobile electronic device, the second portion being configured to contact at least a front face of the mobile electronic device and two generally perpendicular edges of the mobile electronic device, the sidewall comprising a connection structure comprising a protrusion or recess configured to provide a region of contact between the mounting portion and the ring on the mobile electronic device, the connection structure being sized differently from the receiving region, wherein the mounting portion is configured to secure the optical device to the mobile electronic device without obstructing a display on the front face of the mobile electronic device generally parallel with the rear face; and
    the optical component being attachable or attached to the optical device, wherein the optical component is configured to modify an image of light received by an onboard camera lens of the mobile electronic device.

2. The optical system of claim 1, wherein the second wall is configured to extend along the two generally perpendicular edges of the mobile electronic device.

3. The optical system of claim 1, wherein the connection structure comprises one of an adhesive, a magnet, or a suction cup.

4. The optical system of claim 1, wherein the second wall includes an upper wall.

5. The optical system of claim 1, wherein the protrusion or recess of the connection structure of the sidewall comprises a generally arcuate region.

6. The optical system of claim 1, wherein the sidewall comprises an energy conveying path.

7. The optical system of claim 1, wherein the optical component comprises one of a macro lens, a wide angle lens, a fisheye lens, a telephoto lens, or a lens filter.

8. The optical system of claim 1, wherein an optical axis of the optical component is tilted with respect to the rear face of the mobile electronic device.

9. The optical system of claim 8, wherein the tilt of the optical component corresponds to a tilt of the onboard camera lens with respect to the rear face of the mobile electronic device.

10. The combination of the optical system of claim 1 and the mobile electronic device.

11. A method of manufacturing an optical device for use in modifying light to be received by an onboard camera of a mobile electronic device having a rearwardly protruding ring that surrounds an onboard camera, the method of manufacturing the optical device comprising:
    providing a mounting portion comprising a sidewall and an upper wall, the sidewall comprising a receiving region for receiving an optical component, and the sidewall being configured to closely or tightly contact a permanently attached, protruding ring of the mobile electronic device in a ring-receiving region that is different from the receiving region for receiving the optical component, the upper wall being configured to contact at least one of two generally perpendicular edges of the mobile electronic device, wherein the mounting portion comprises an attachment surface to secure the optical device to the mobile electronic device without obstructing a display on a front face of the mobile device generally parallel with the rear face; and
    providing an optical component configured to modify an image of light received by an onboard camera lens of the mobile electronic device, the optical component being configured to attach to the mounting portion.

12. The method of claim 11, wherein the optical component is configured to be removably attachable to the mounting portion.

13. The method of claim 11, further comprising providing an adapter component configured to be removably attachable to the mounting portion, the adapter component comprising two sidewalls forming a channel, wherein the channel generally corresponds to the width of a mobile electronic device.

14. The method of claim 11 wherein the method further comprises the step of providing the mobile electronic device.

15. An auxiliary optical system configured to be removably attachable to a mobile electronic device having on a rear side an onboard camera and a circular, continuous ring with a smooth outer circumference surrounding a circumference of the onboard camera on the mobile electronic device, the ring extending in a rearward direction beyond a rear face of the mobile electronic device, the auxiliary optical system comprising:
  one or more optical components configured to receive light on a first side and to transmit light through to a second side to modify an image to be received by the onboard camera of the mobile electronic device; and
  a mounting portion with a front side and a rear side, the mounting portion being attached or attachable to the one or more optical components, the mounting portion comprising a ring-receiving region on the rear side that is sufficiently large to receive the ring of the mobile electronic device in the ring-receiving region, such that the mounting portion is configured to fit tightly in a contacting relationship with the mobile device, thereby permitting the auxiliary optical system to be removably attachable with the mobile electronic device by way of the contact between the mounting portion and the mobile electronic device, wherein the one or more optical components are configured to be positioned in a generally co-axial and overlapping relationship with the onboard camera of the mobile electronic device when the mounting portion is attached to the mobile electronic device.

16. The combination of the auxiliary optical system of claim 15 and the mobile electronic device.

17. The auxiliary optical system of claim 15, wherein the mounting portion is not configured to clip over a side edge of the mobile electronic device.

18. The auxiliary optical system of claim 15, wherein the mounting portion is not configured to clip over a top edge of the mobile electronic device.

19. The auxiliary optical system of claim 15, wherein the mounting portion is not configured to contact a front side of the mobile electronic device opposite from the rear side of the mobile electronic device on which the onboard camera of the mobile electronic device is positioned.

20. The auxiliary optical system of claim 15, wherein the mounting portion is not configured to clip over any of a side edge or a top edge of the mobile electronic device and not configured to contact a front side of the mobile electronic device opposite from the rear side of the mobile electronic device.

21. The auxiliary optical system of claim 15, wherein the ring-receiving region is an aperture.

22. The auxiliary optical system of claim 21, wherein the aperture is circular.

* * * * *